US010097233B2

(12) United States Patent
 Pratt

(10) Patent No.: US 10,097,233 B2
(45) Date of Patent: Oct. 9, 2018

(54) FULL DUPLEX RADIO

(71) Applicant: ANALOG DEVICES GLOBAL, Hamilton (BM)

(72) Inventor: Patrick Pratt, Mallo (IE)

(73) Assignee: ANALOG DEVICES GLOBAL, Hamilton (BM)

( * ) Notice: Subject to any disclaimer, the term of this patent is extended or adjusted under 35 U.S.C. 154(b) by 159 days.

(21) Appl. No.: 14/826,316

(22) Filed: Aug. 14, 2015

(65) Prior Publication Data

US 2016/0119019 A1   Apr. 28, 2016

(30) Foreign Application Priority Data

Oct. 22, 2014   (GB) .................................. 1418814.8

(51) Int. Cl.
| | |
|---|---|
| *H04B 7/06* | (2006.01) |
| *H04B 1/525* | (2015.01) |
| *H04L 5/14* | (2006.01) |
| *H04W 4/70* | (2018.01) |
| *H04L 25/00* | (2006.01) |

(52) U.S. Cl.
 CPC ........... *H04B 1/525* (2013.01); *H04B 7/0617* (2013.01); *H04L 5/1461* (2013.01); *H04L 25/00* (2013.01); *H04W 4/70* (2018.02)

(58) Field of Classification Search
 CPC .... H04B 1/525; H04B 7/0617; H04B 7/0857; H04B 1/38; H04B 7/0413; H04L 5/1461; H04L 5/14; H04L 25/00; H04W 4/005
 See application file for complete search history.

(56) References Cited

U.S. PATENT DOCUMENTS

| | | | | |
|---|---|---|---|---|
| 2007/0046278 A1* | 3/2007 | Taenzer | ............... | G10K 11/341 324/76.77 |
| 2007/0268857 A1* | 11/2007 | So | .......................... | H04B 1/525 370/328 |
| 2008/0063091 A1* | 3/2008 | Dong | .................. | H04L 25/0276 375/257 |
| 2008/0101497 A1* | 5/2008 | Gaikwad | .............. | H04B 7/0413 375/267 |
| 2008/0232268 A1 | 9/2008 | Masoud et al. | | |

(Continued)

FOREIGN PATENT DOCUMENTS

WO   2013/095386   6/2013

OTHER PUBLICATIONS

International Search Report and Written Opinion issued in International Patent Application Serial No. PCT/EP2015/073598 dated Apr. 25, 2016, 19 pages.

*Primary Examiner* — Raj Jain
(74) *Attorney, Agent, or Firm* — Patent Capital Group

(57) ABSTRACT

Embodiments of full duplex radios are disclosed herein. For example, a radio may include: a first transmitter, a second transmitter, and a receiver. The first transmitter may be configured to receive an input signal, process the input signal to generate a first transmit signal, and transmit the first transmit signal. The second transmitter may be configured to receive the input signal, process the input signal to generate a second transmit signal, and couple the second transmit signal into an input path of the receiver. Leakage at the receiver may thus be reduced. Some embodiments of a radio may also include a base band correction circuit and means for reducing transmitter noise that leaks into the receiver.

12 Claims, 18 Drawing Sheets

(56) References Cited

U.S. PATENT DOCUMENTS

| | | | |
|---|---|---|---|
| 2011/0085538 A1* | 4/2011 | Feinberg | H04J 1/12 370/343 |
| 2011/0299434 A1* | 12/2011 | Gudem | H04B 1/109 370/278 |
| 2012/0201173 A1* | 8/2012 | Jain | H04B 1/525 370/277 |
| 2012/0230444 A1* | 9/2012 | Ravid | H04B 7/0617 375/267 |
| 2013/0089009 A1* | 4/2013 | Li | H04L 27/2601 370/278 |
| 2013/0155913 A1 | 6/2013 | Octavian | |
| 2013/0294295 A1* | 11/2013 | Viswanathan | H04L 5/1461 370/278 |
| 2013/0301487 A1 | 11/2013 | Keyvan | |
| 2014/0269970 A1* | 9/2014 | Pratt | H04B 1/10 375/285 |
| 2015/0269852 A1 | 9/2015 | Cecil et al. | |
| 2016/0119019 A1* | 4/2016 | Pratt | H04B 1/525 370/278 |

* cited by examiner

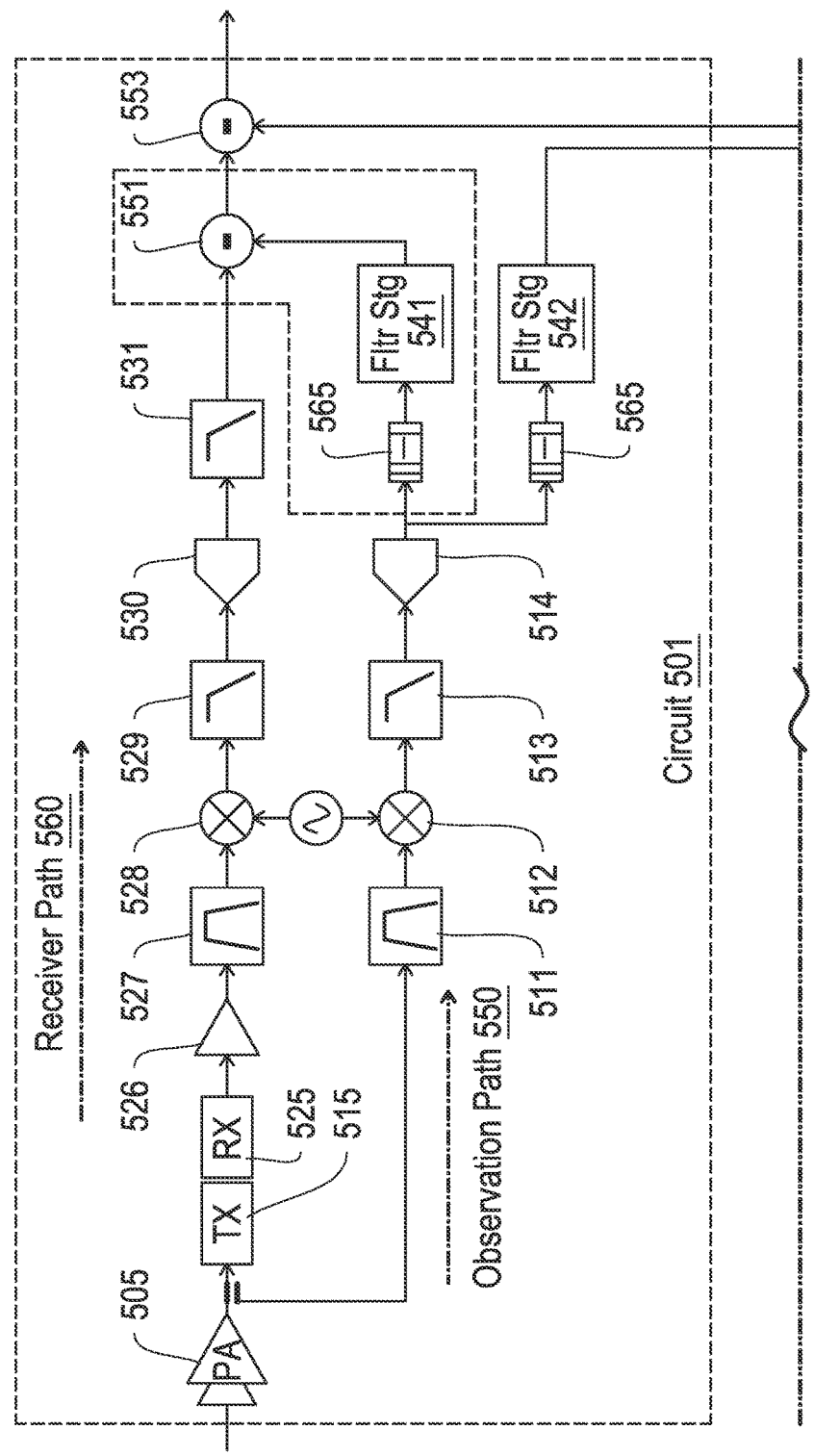

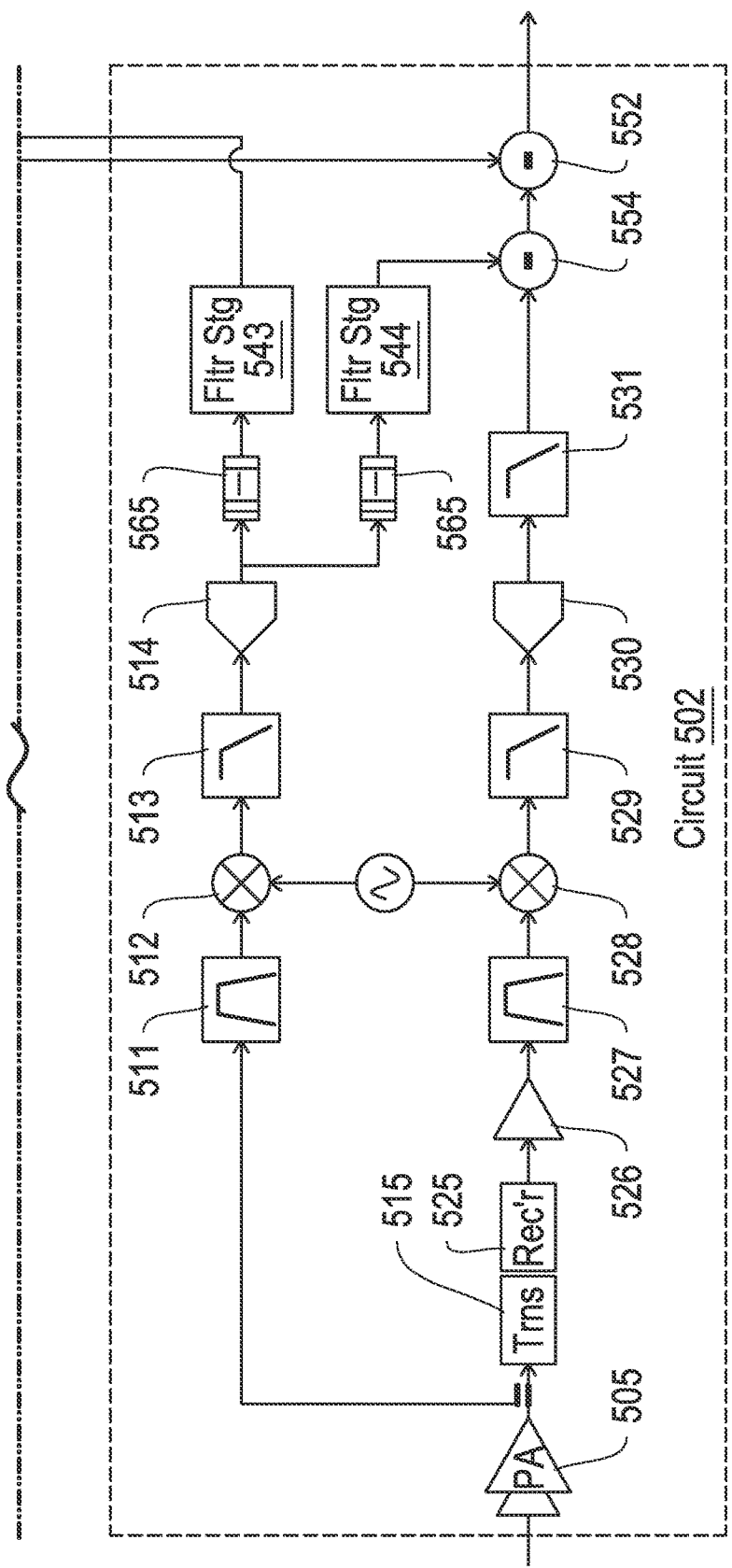
Fig. 16 (part 2)

US 10,097,233 B2

FULL DUPLEX RADIO

CROSS-REFERENCE TO RELATED APPLICATION

This application claims priority to UK Patent Application No. 1418814.8, filed Oct. 22, 2014 and titled "FULL DUPLEX RADIO." The priority application is incorporated herein in its entirety by reference.

FIELD

The present disclosure relates to a full duplex radio.

BACKGROUND

The radio and microwave spectrum is a finite resource that is shared between many users. In order to achieve this sharing, governments allocate various portions of the spectrum to various users. This results in users, such as mobile telephony service operators, having to pay significant amounts of money in order to have access to limited portions of the RF spectrum.

BRIEF DESCRIPTION OF THE DRAWINGS

Embodiments of full duplex radio transceivers in accordance with the present disclosure will now be described, by way of non-limiting example only, with reference to the accompanying Figures, in which:

FIG. 16 shows another transmit noise cancellation circuit; and

DETAILED DESCRIPTION

Figure 1:
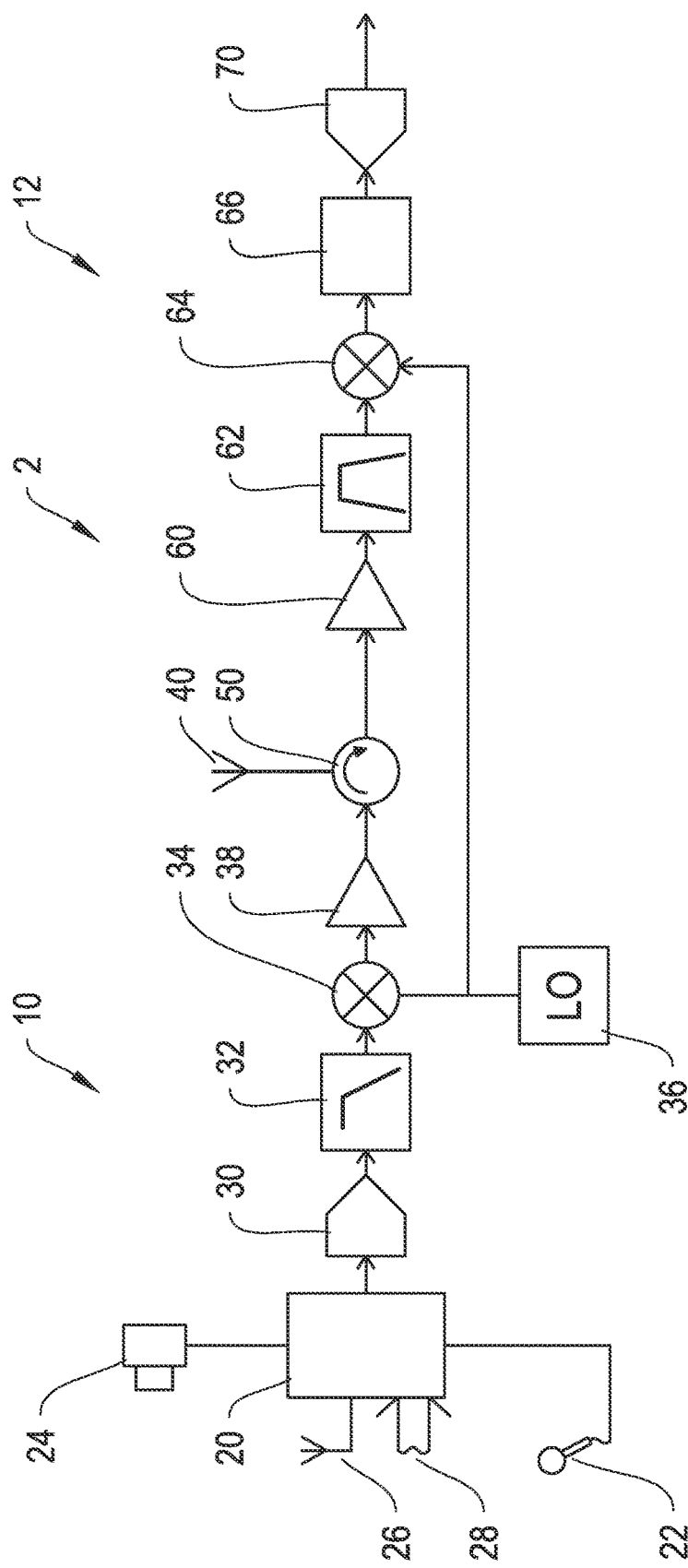
FIG. 1 schematically illustrates a transceiver architecture for a full duplex radio.

As noted above, users often have to pay significant amounts of money in order to have access to limited portions of the RF spectrum. Having made such a commitment, it is desirable to use the spectrum as economically as possible.

For bidirectional communication, each transceiver needs to be able to transmit and receive. The transmitter power of each transmitter has to be sufficient that it has an acceptable power level at the receiver of the other transceiver with which it is communicating. The transceivers may be separated by a considerable distance. However, within a transceiver, the transmitter may be approximately coincident with its own receiver. Therefore the receiver of the transceiver receives a large signal from its own transmitter, and a much weaker signal from the transmitter of the remote transceiver that it is seeking to communicate with.

In order to overcome this power disparity, radio systems operators have relied upon multiplexing techniques. In a time division multiplex technique, the transmitter and receiver do not operate concurrently. Therefore steps can be taken to protect the receiver front end whilst the transmitter is operating. Once the transmission has been completed, the receiver front end can be placed into an operational state in order to receive signals from other devices. An alternative approach is frequency division multiplexing, where the transmit frequency and receive frequency are separated by a guard band such that a filter can be used to filter out the interference from the transceiver's own transmitter. Whilst both of these techniques may be useful, they effectively reduce the amount of traffic which can be carried within a given bandwidth by at least a factor of 2. Therefore it would be highly desirable to be able to operate a full duplex radio.

Various embodiments of full duplex radios are disclosed herein. In some embodiments, the radio may include a first transmitter and a receiver. The radio also may include a second transmitter. The first transmitter may be arranged to receive an input signal, such as a data stream, and to process the input signal to generate a first transmit signal, and to transmit the first transmit signal. Processing of the input signal may include converting a digital signal to the analog domain. It also may include up converting the input signal, be that in the analog to digital frequency domains, amplifying the up converted signal and transmitting it.

The second transmitter may be arranged to receive the input signal, and to process the input signal to generate a second transmit signal. The second transmit signal may not be transmitted, but instead may be injected into the input signal path of the receiver. The second transmitter may further include an adaptation engine and a signal processing unit for modifying the data of the input signal in order to generate a second transmit signal which is substantially a negated and scaled version of the first transmit signal, as received by the receiver. The adaptation engine may monitor the output of the receiver, and adapt the signal processing performed by the signal processor in order to minimize the power or influence of the first transmit signal at an RF front end of the receiver.

Various ones of the full duplex radios disclosed herein may enable a reduction in the power of the transmit signal at an RF front end, such as a low noise amplifier of the receiver. This is important as the presence of an interfering signal leaking into the receiver from the first transmitter could overload the receiver input stages. This might damage the receiver front end, or effectively desensitize the receiver such that it could not process an incoming wanted signal at the same frequency.

In some embodiments, the radio may further include a baseband interference processing arrangement for removing the influence of leakage from the first transmitter in the signal propagated through or output from a baseband processing section of the receiver.

In some embodiments, the radio may further include a transmit channel noise cancelling arrangement for estimating a noise power leaking into the receiver from the first transmitter and from the second transmitter, and for processing that noise so as to reduce its impact within the receiver or data processing systems coupled to the receiver.

Some of the embodiments disclosed herein provide a radio having a first transmit unit and a first receive unit. The first transmit unit may include a first transmitter and a second transmitter. The first transmitter may be arranged to receive an input signal, and to up convert it for supply to an antenna. The second transmit signal may be arranged to receive the input signal and to adapt it and to up-convert it to generate an RF correction signal to be introduced into an RF receive path for the first receive unit. In use, the RF correction signal may interfere destructively with leakage into the receive unit of the transmit signal from the first transmitter. This destructive interference may reduce the interference from the first transmitter at the RF input stage of the first receive unit. In some embodiments, the radio may further include a transmitter noise reduction circuit for processing noise from the first and second transmitters to produce a noise reduction signal which can be introduced into the signal path of the receive unit or combined with the output of the receive unit in order to improve the effective signal to noise ratio of the received signal.

Some embodiments of the duplex radios disclosed herein may include a transmitter, receiver, an RF correction circuit for reducing a received signal from the transmitter at an RF front end of the receiver, and a baseband correction circuit for reducing a received signal from the transmitter in a baseband portion of the receiver.

In some embodiments, the teachings provided herein can be applied to multiple input multiple output, MIMO, transceiver architectures in order to reduce leakage from a transmitter to its associated receiver of a transmitter receiver pair, and also to reduce signal leakage from one transmitter to a further receiver within the MIMO transceiver.

Full duplex radio in accordance with the embodiments disclosed herein may have one or more uses over many frequency bands. For example, radios may be used for point to point communication between people or machines. Such full duplex radios can be used as an enabling technology in the "internet of things". Full duplex radios may also be used in communication between base stations and mobile telephony devices. A mobile telephony device may include a terminal arranged to perform voice calls, video calls, or handle data traffic, or indeed one or more of these things. Thus telephones, smart phones and wireless modems all represent examples of such devices. The teachings of the present disclosure may also be used in a backhaul communications link between a base station and a telephony or data transmission network. The teachings described herein can be used across a wide range of frequencies and transmission and encoding schemes, and thus can be used in conjunction with, for example, schemes such as code division multiple access (or indeed any other multiple access scheme), thereby allowing many users to share a frequency space.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the term "engine," "detector," or "canceller" may refer to an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware that provide the described functionality.

FIG. 1 schematically illustrates a duplex radio, generally indicated 2, which includes a transmitter section generally indicated 10, and a receiver section generally indicated 12. The transmitter section 10 may include a baseband signal acquisition and processing portion 20 which may receive data from an audio input such as a microphone 22, a video input such as a camera 24, data over a further wireless network, such as "WIFI", Bluetooth, or further communications schemes schematically illustrated by the antenna 26, or it may receive data over a databus 28. Such data may be received from a machine (which is used in the loosest sense and includes both domestic appliances and industrial machines) associated with the radio 2. Data received by the baseband unit 20 may be subjected to error correction coding or other baseband processing. Furthermore, it may be formatted for transmission and may also be subject to digital predistortion before being provided to the other parts of the transmitter 10.

Data from the baseband unit 20 is provided to a digital to analog converter 30 for conversion between the digital and analog domains. An output of the digital to analog converter 30 is provided as an input to a low pass filter 32. An output of the low pass filter 32 is provided to a signal input of a mixer 34. The mixer also receives a local oscillator signal from a local oscillator 36. The mixer and local oscillator may be arranged to act on in-phase and quadrature signals as known to the person skilled in the art, and therefore the local oscillator may be arranged to provide two outputs at the same frequency and amplitude, but where the signal at one output is 90° out of phase with respect to the signal at the other output. The output from the mixer, such as the quadrature mixer 34, is then provided to one or more amplifiers 38 which are connected to a transmit antenna 40.

A full duplex radio may use separate transmit and receive antennas. Alternatively, and as shown in FIG. 1, a single antenna is shared between the transmitter 10 and the receiver 12. In order to provide isolation between the transmitter and receiver, an isolator 50 such as a circulator is provided. Such devices are well known to the person skilled in the art and need not be described here. Typically a circulator may provide in the region of 20 dB of isolation.

The receiver 12 includes an RF front end amplifier 60 which receives a signal from the antenna 40 and amplifies it. An output of the amplifier 60 is provided to a bandpass filter 62. An output of the bandpass filter is provided to a signal input of a mixer 64. The mixer 64 receives a local oscillator signal from the local oscillator 36. This allows the incoming signal to be frequency converted back to baseband, or at least to the frequency range as output by the digital to analog converter 30 of the transmitter. The output of the mixer is provided to a further bandpass filter 66. An output of the filter 66 is provided to an analog to digital converter 70.

The architecture schematically illustrated in FIG. 1 can be used in direct conversion receivers or intermediate frequency receivers. The intermediate frequency may be generated in the digital domain. Alternatively further mixers and local oscillators may be provided in the signal path between the output of the digital to analog converter 30 and the mixer 34 in the transmitter, and similarly a second mixer and associated local oscillator can be arranged downstream of the mixer 64 of the receiver.

The architecture described in FIG. 1 exhibits significant difficulties when operating in full duplex mode. In order to understand this, the relative powers of signals at the input to the RF amplifier 60 in the receiver are considered with respect to FIG. 2. Suppose, for example that the transceiver of FIG. 1 is engaged in point to point communication with a second transceiver that is located at some distance away. Furthermore, a third transceiver operated on the same frequency but using a different code within a CDMA scheme as the first receiver and the second receiver, is also present.

Figure 2:
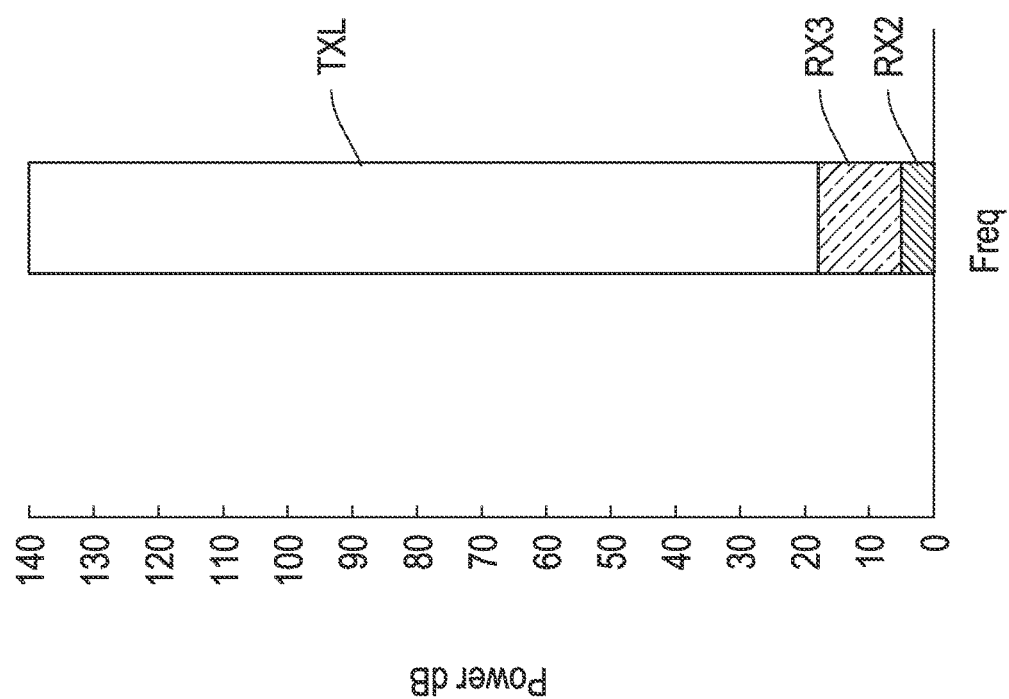
FIG. 2 schematically represents the power difference at the RF input stage of a receiver between signals RX2 and RX3 which may represent one or more signals that the transceiver wishes to receive, with a signal TXL representing the magnitude of a leakage signal from the transmitter portion of the transceiver.

FIG. 2 schematically illustrates the relative powers of the signals received at the receiver relative to a scale where 0 dB represents the absolute minimum acceptable receive power of a signal for the receiver to operate. The wanted signal from the second transceiver is designated RX2 and in this example has a signal power which is a few dB above the minimum required for reception. This signal may have to compete with the signal RX3 from the third transceiver which is received with a stronger signal power, in this example around 18 dB above the minimum power level.

In such a scenario where the first and second transceivers are distant, for example a mobile telephone at the edge of a cell around a base station, then the transmitter of the first transceiver may be operating at close to its maximum allowed output. As a consequence the transmitter signal leaking through the isolator 50 may be around 140 dB above the minimum power level. This discrepancy in received powers will swamp the front end amplifier 60 and will either damage it, or require its input signal to be attenuated to such an extent that the wanted signal RX2 becomes lost in the noise of the receiver or is diminished to beneath a sensitivity threshold.

Figure 3:
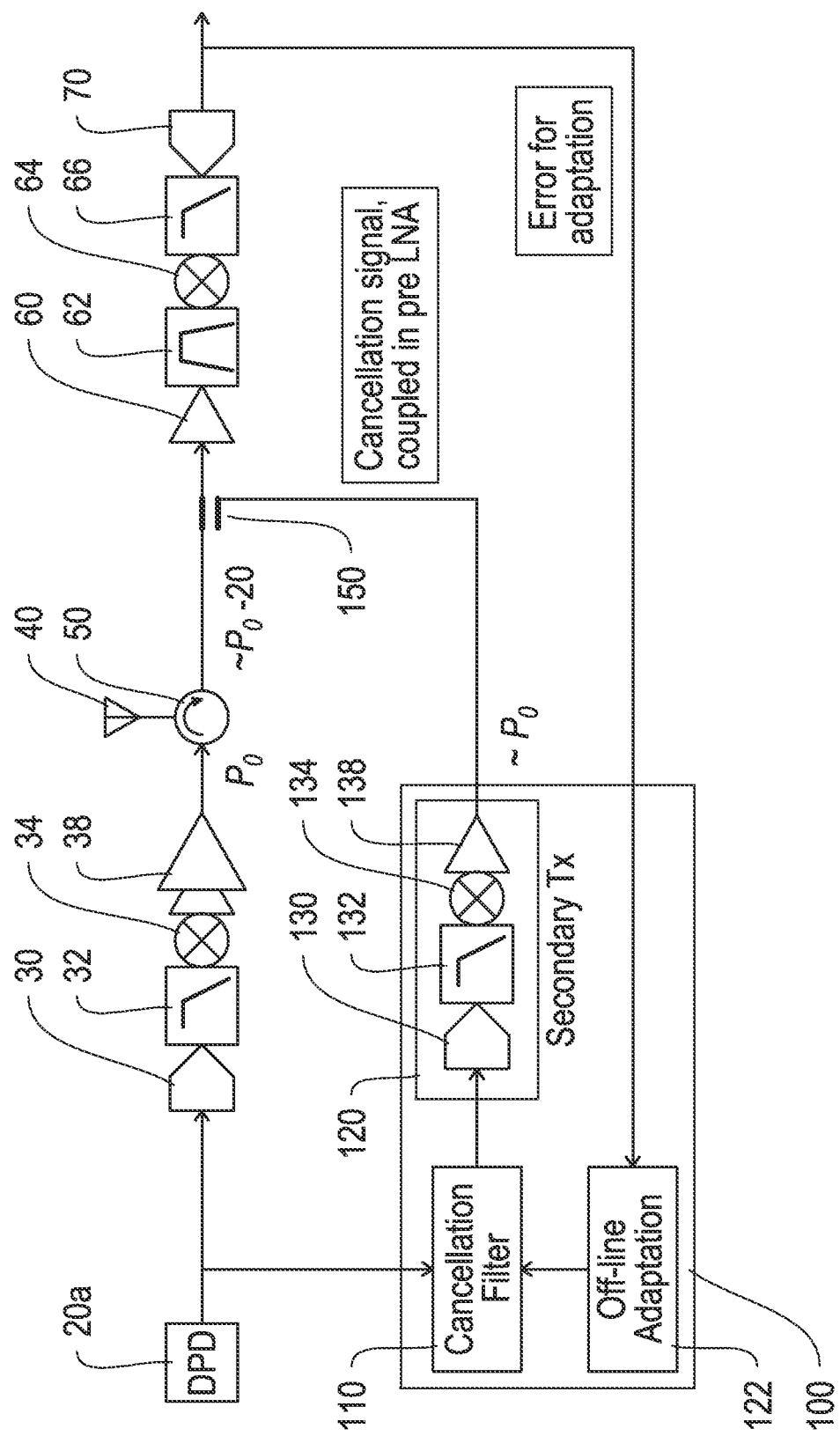
FIG. 3 schematically illustrates a modified transceiver arrangement constituting an embodiment of this disclosure including a second transmitter arranged to introduce a cancellation signal into the RF front end of the receiver.

FIG. 3 represents a modification to the arrangement shown in FIG. 1, where a second transmitter 100 is provided, and arranged to receive the output of the baseband processing unit, which may include a digital pre-distorter 20a. The second transmitter 100 includes a signal processor, which for convenience may be implemented as a finite impulse response cancellation filter 110, a secondary transmitter path 120 and an adaptation engine 122. The secondary transmitter path 120 may include a digital to analog converter 130 which substantially mirrors the digital to analog converter 30, a filter 132 which mirrors the operation of the filter 32, a mixer 134 which mirrors the operation of the mixer 34 and which is also connected to receive signals from the local oscillator 36, and a power amplifier 138 which mimics the performance of the power amplifier 38, although it need not be so powerful and hence not draw so much current. Ideally the amplifier 38 would be linear, but in reality the amplifier 38 may exhibit some non-linearity. In which case, the amplifier 138 is preferably but not necessarily designed to mimic as closely as possible the performance and non-linearities of the amplifier 38. An output of the amplifier 138 is provided to the input of the receiver front end amplifier 60 by way of a coupler 150. The coupler may be a directional coupler. The performance of such devices is well known to the person skilled in the art and need not be described here. Alternatively, the amplifier 138 may be connected to the input of the amplifier 60 by a suitable attenuation and DC blocking network.

In use, the cancellation filter 110 receives the digital data from the baseband processor, and filters it such that the output of the secondary transmitter 120 that is coupled to the receiver RF front end amplifier 60 is such that it interferes destructively with leakage from the amplifier 38 via the isolator 50 (or from one transmit antenna to the receive antenna in a radio where separate transmit and receive antennas are used) to the RF amplifier 60.

The output of the receiver is picked off at the output of the analog to digital converter 70 and fed back to an adaptation engine 122 which may be arranged to cross correlate the output of the receiver with the data stream received from the baseband processor 20 in order to identify components of the transmitted data stream in the output of the receiver, and to vary the coefficients of the cancellation filter so as to maximize the destructive interference between the leakage through the isolator 50 of the transmitted signal and the output from the amplifier 138.

In testing this technique has been shown to add a further 55 to 60 dB of reduction of the transmit signal leakage at the RF receiver front end. Therefore the desensitization of the RF front end has been reduced by around 70 dB or so. This allows the front end amplifier to operate at a much higher gain, and therefore pass signal, RX2, through to the remaining components of the receiver for demodulation.

Figure 4:
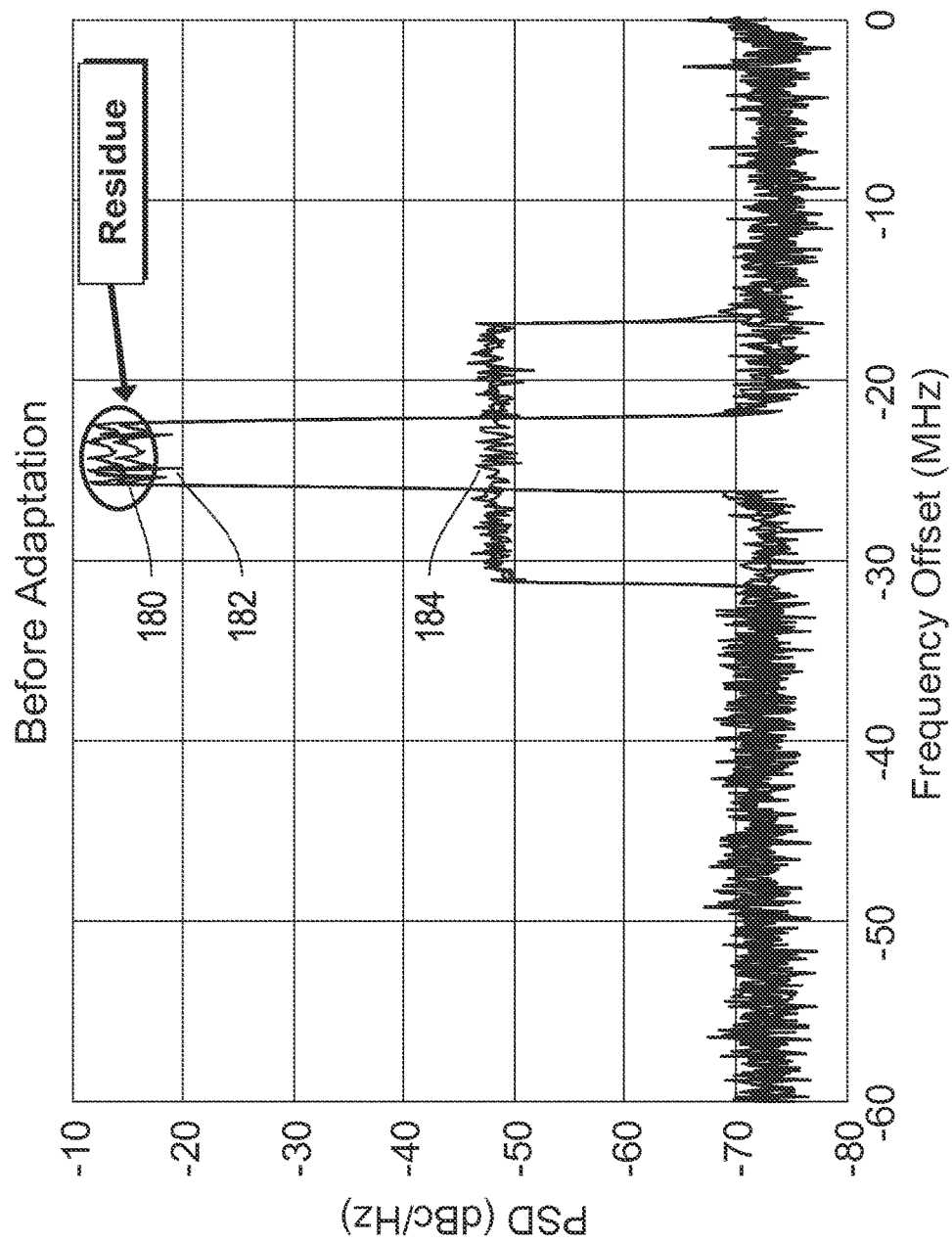
FIG. 4 schematically illustrates the bandwidth and relative powers of the wanted signal, and blocker signal (that interferes with or blocks reception of a wanted signal) resulting from transmitter leakage the receiver front end prior to performing a cancellation and adaptation process.

FIG. 4 schematically illustrates the various amplitudes which may be encountered in the receiver. FIG. 4 illustrates the relative powers of signals against a logarithmic scale, where the signal 180 represents the transmit power from the transmitter output stage 38, the line 182 represents the power from the transmit amplifier 38 that has leaked through the isolator 50 and the line 184 represents a wanted signal which is some 40 dB down on the amplifier power that has leaked through the isolator.

The adaptation engine 122 adjusts the cancellation filter coefficients in order to set the relative delay, amplitude and phase of the signal that is admitted via the coupler 150 such that it interferes destructively with the leakage signal that propagated through the isolator 50. The cancellation filter 110 is typically a complex (by which we mean that it handles both real and imaginary components) finite impulse response filter, which is typically between 12 and 20 delay stages long. Other filter lengths may be used. Other filter technologies may also be used and the filter is not constrained to being a FIR filter.

Figure 5:
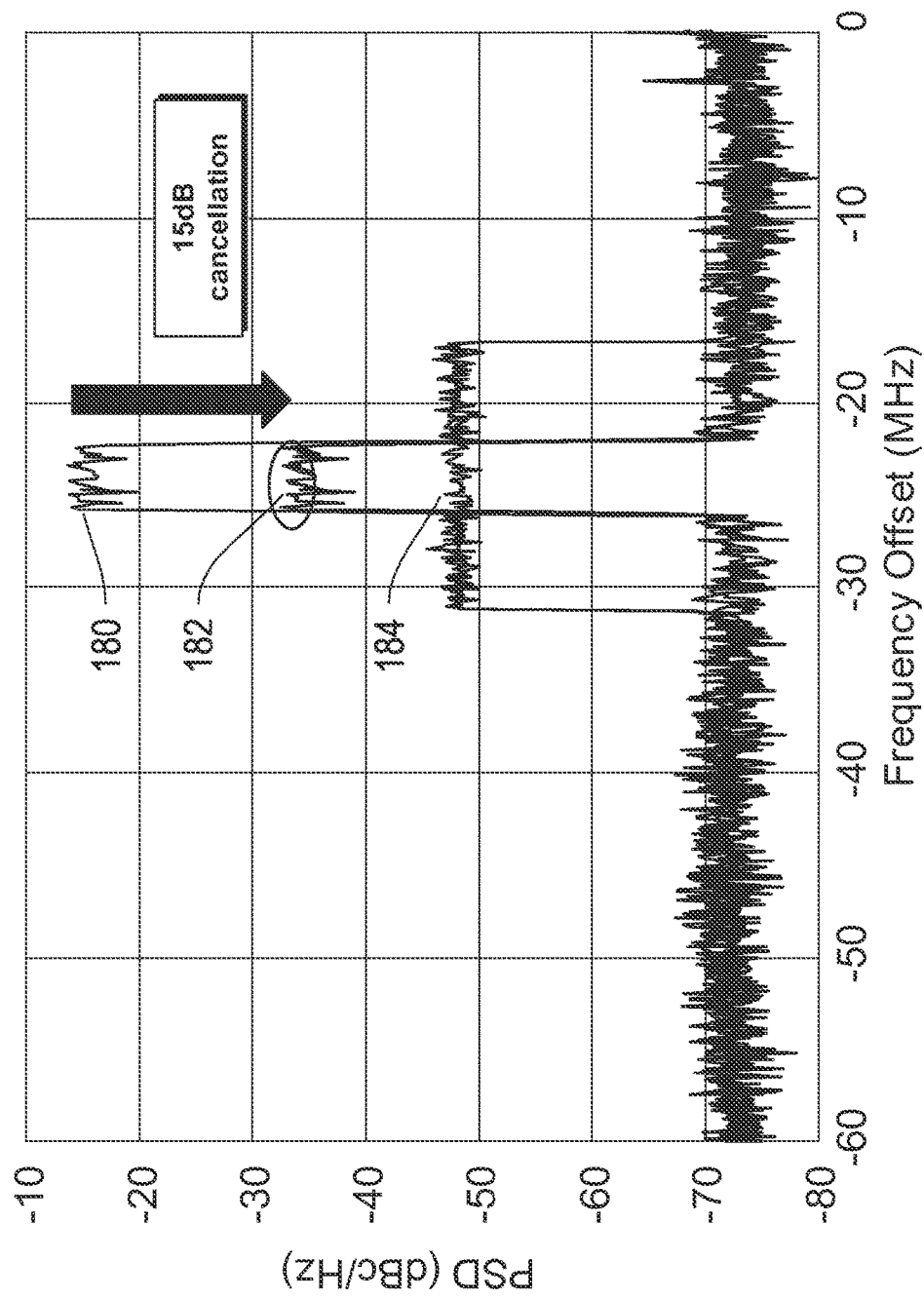
FIG. 5 represents the reduction in the blocker amplitude during early stage or adaptation.
Figure 6:
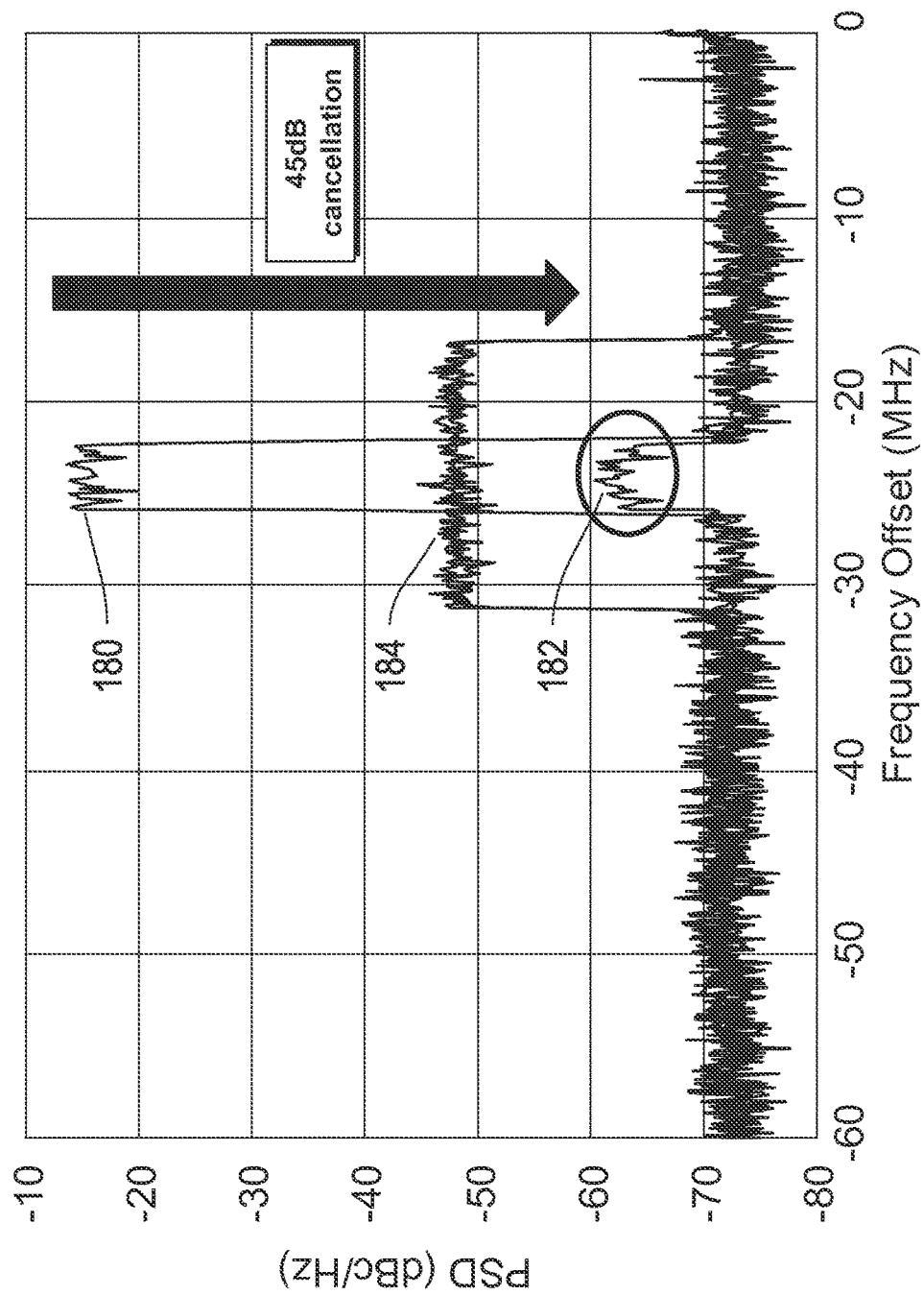
FIG. 6 represents the reduction in blocker amplitude when the adaptation engine is close to converging on an optimal solution.
Figure 7:
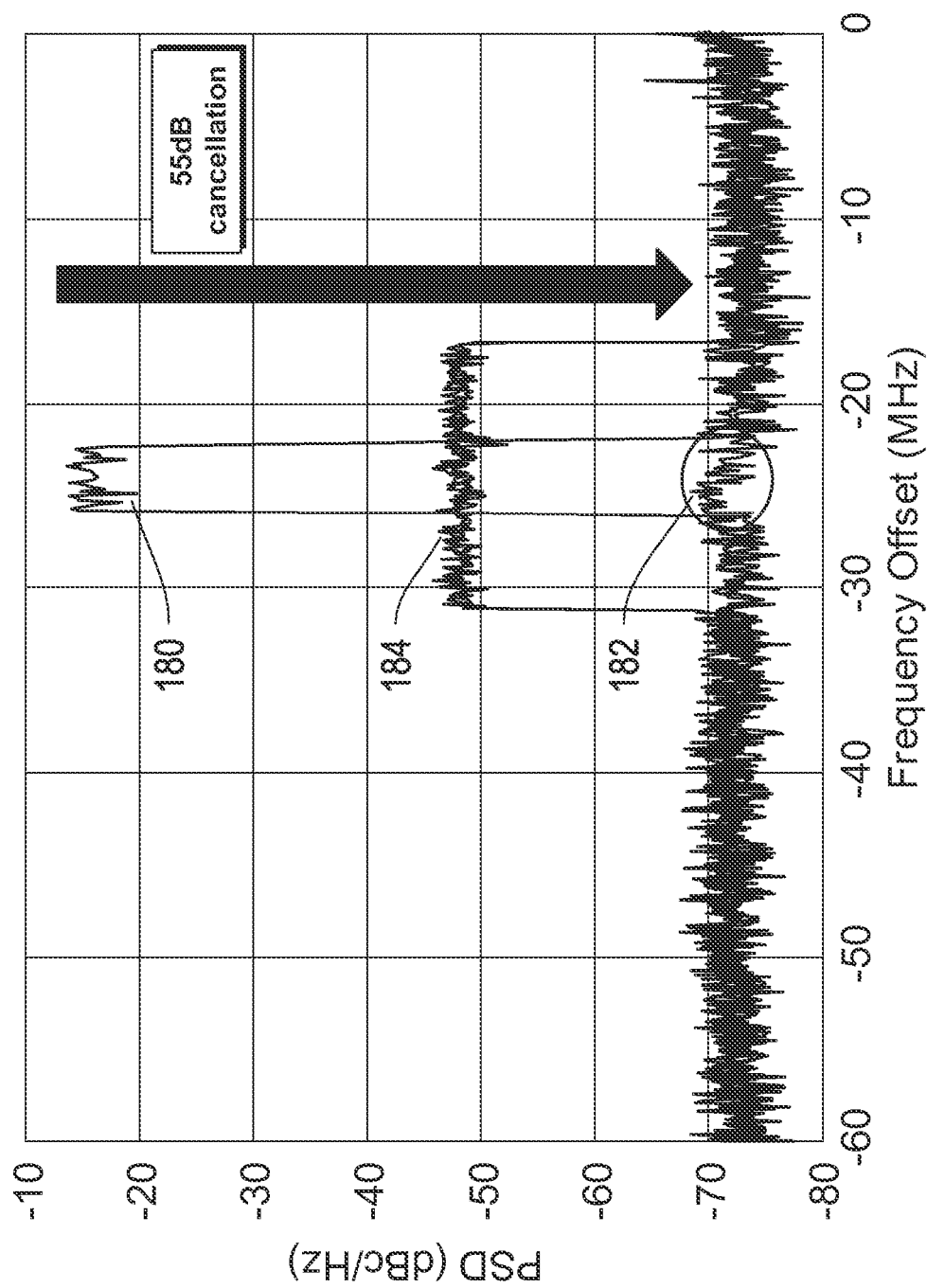
FIG. 7 represents the relative reduction of the blocker signal once the cancellation engine has fully adapted.

The adaptation engine 122 correlates the output signal from the output 70 of the receiver 12 with the input signal and uses this to adjust the filter. FIG. 5 schematically illustrates an early stage of adaptation where an additional 15 dB of cancellation has been achieved. As the process continues and the filter coefficients improve, then the cancellation improves to 45 dB, and subsequently to 55 dB as schematically illustrated in FIGS. 6 and 7, respectively.

Thus in this example some 55 dB of cancellation has been achieved, which allows the front end amplifier 60 to operate at a significantly greater gain than otherwise would have been the case. Although the leakage signal has, in FIG. 7, been shown as being less than the wanted signal 184 this may not always be the case, especially when for example a mobile telephone is operating at the very edge of its cell.

Figure 8:
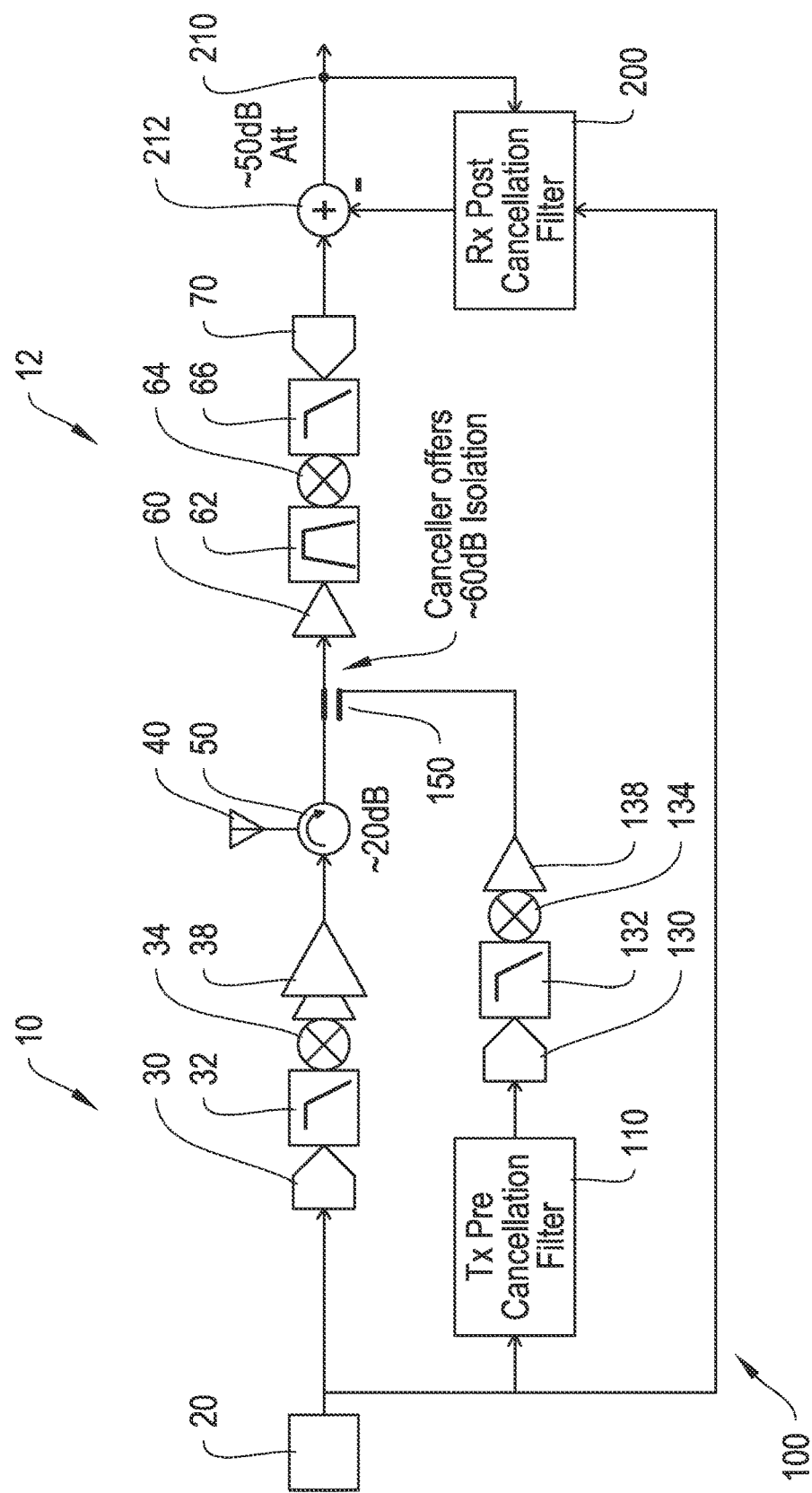
FIG. 8 shows a further embodiment of a duplex radio in which the a baseband cancellation system is also included to further attenuate interference from the signal transmitted by the transmitter.

The teachings described herein can be extended by the addition of a post reception baseband cancellation filter as shown in FIG. 8.

The post reception cancellation filter can apply a baseband cancellation signal either within or following the baseband processing of the receiver 12. As shown in FIG. 8 the baseband cancellation filter 200 receives a representation of the input signal stream as output by the transmit baseband processor 20 and correlates this with the signal at an output node 210 in order to generate a cancellation signal which is subtracted from the output signal from the analog to digital converter 70 by an adder 212.

The post cancellation filter 200 can be implemented as a finite impulse response filter acting in both the real and imaginary domains.

Figure 9:
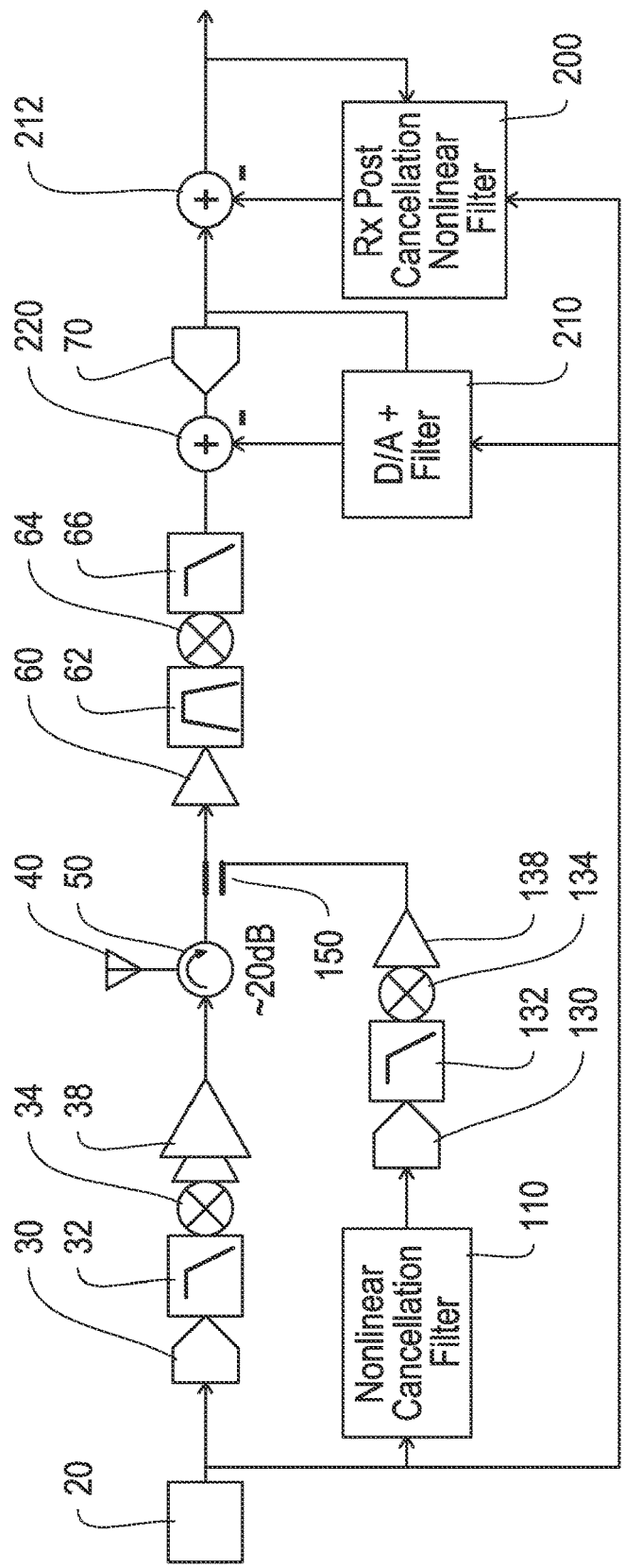
FIG. 9 illustrates a variation on FIG. 8 where two baseband cancellation circuits are provided, and the cancellation processing has been adapted to include non-linear terms.

Cancellation may also be done in the analog baseband domain, either as an alternative to or in addition to the digital cancellation. Such an arrangement is shown in FIG. 9 where a further cancellation circuit 210 including a cancellation filter and a digital to analog converter is arranged to receive the input signal stream, and to compare this with the output signal stream at the output of the analog to digital converter 70 in order to derive a signal to be injected via an adder 220 placed between the mixer 64 and the analog to digital converter 70. This arrangement has the possibility of reducing the dynamic range of the signal at the input to the analog to digital converter 70. This can be advantageous as it reduces the design requirements on the analog to digital converter, both in terms of its dynamic range and potentially in terms of its resolution.

Furthermore, the cancellation filters within the units 210, 200 and 110 may include non-linear terms to account for non-linear distortion within the amplifiers.

The use of an adaptive filter 110 within the second transmitter 100 means that the signals at the outputs of the first amplifier 38 and the second amplifier 138 are correlated and add destructively, but the noise components at the outputs of the amplifiers 38 and 138 are not correlated and hence add together to worsen the noise introduced into the receiver 12.

Figure 10:
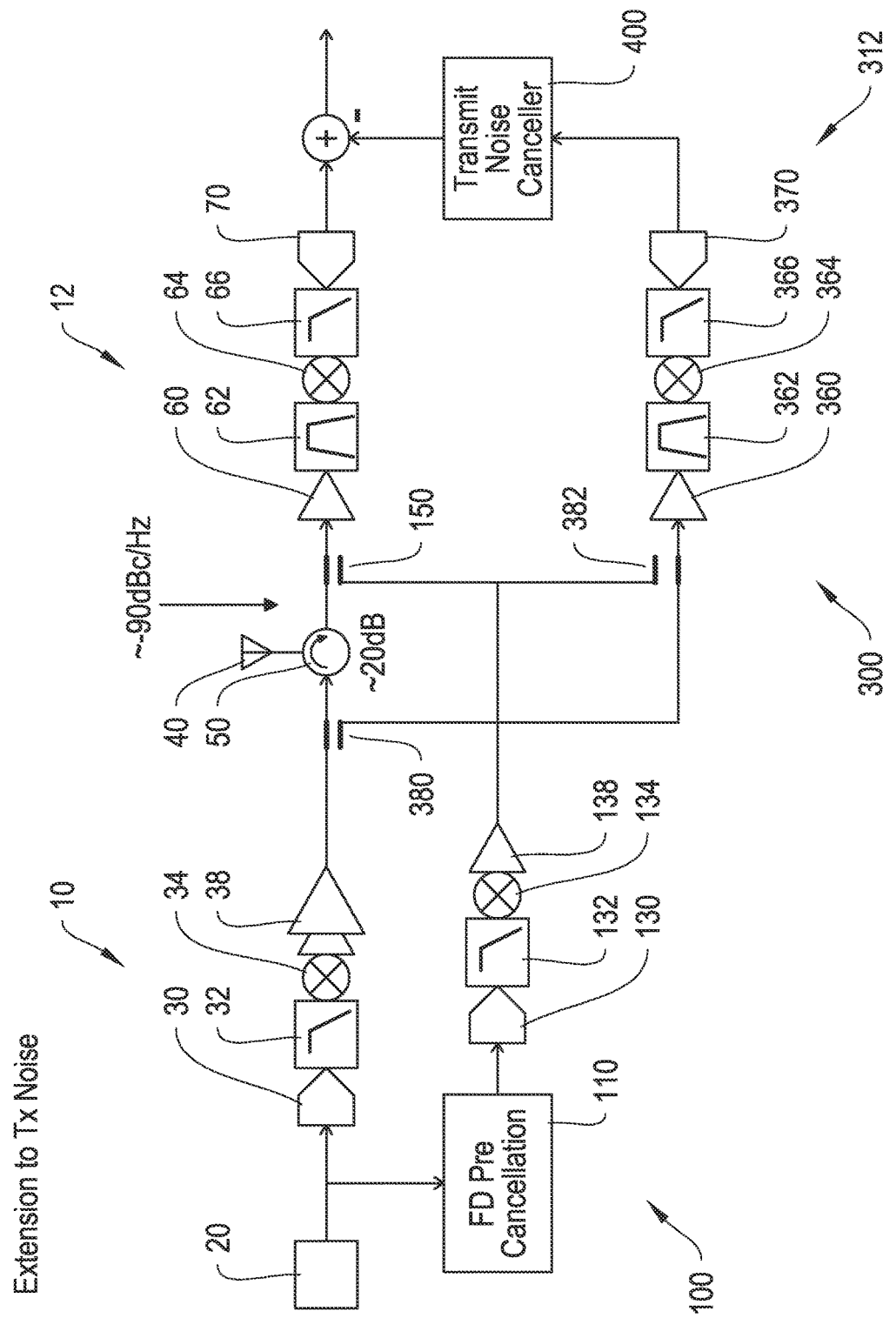
FIG. 10 schematically illustrates a transmit noise canceller and receiver in conjunction with the RF interference reduction circuit of FIG. 3, although it is to be understood that the transmit noise canceller can also be used in combination with the arrangements shown in FIG. 8 or 9.

FIG. 10 schematically illustrates the components of a noise cancellation circuit which may be used in conjunction with any of the circuits described hereinbefore. The noise cancellation circuit, generally designated 300 includes a second receiver, generally designated 312 which matches the performance of the receiver 12. Thus, it includes a RF front end 360, a bandpass filter 362, a mixer 364, a low pass filter 366 and an analog to digital converter 370 arranged as described hereinbefore with respect to the receiver 12. The RF front end 360 of the second receiver receives its signal from two couplers 380 and 382 which provide signals from the output of the amplifier 38 and the output of the amplifier 138, respectively. The couplers are directional couplers in order to reduce signal contamination between the first and second transmit signals derived from the first amplifier 38 and the second amplifier 138. The relative coupling coefficients between the directional couplers 380 and 382 are selected such that the signal component from the first amplifier 38 interferes destructively and substantially cancels with that from the second amplifier 138. The relative signal and noise components are shown in greater detail in FIG. 11.

Figure 11:
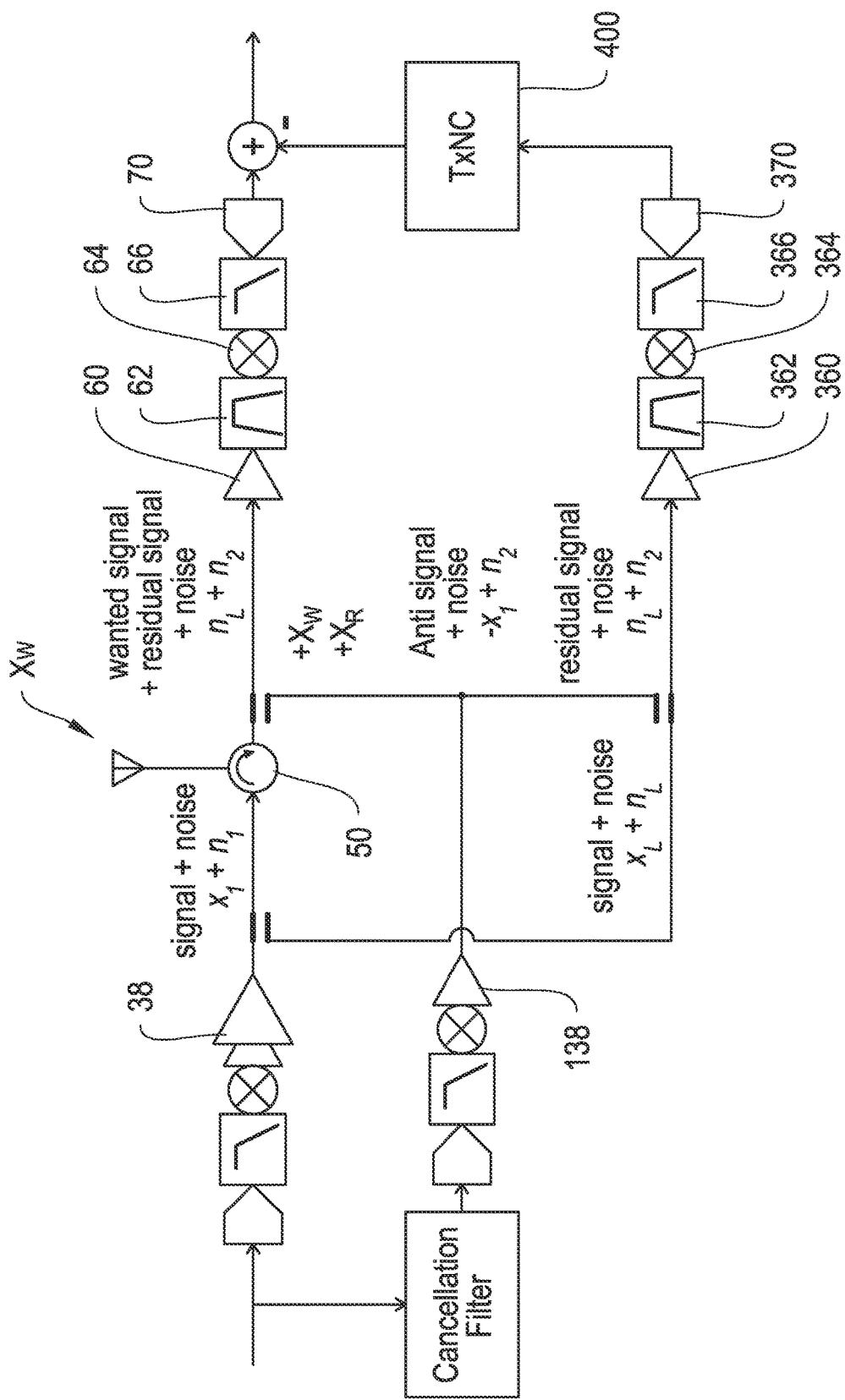
FIG. 11 shows the arrangement of FIG. 10 in more detail, and showing the relative signal and noise components and various nodes within the circuit.

As shown in FIG. 11, the output of the first amplifier 38 includes a signal component X1 and a noise component N1. By the time these have leaked through the circulator, these can be represented as XL and NL respectively being attenuated versions of X1 and N1. The output of the second amplifier 138 should represent a signal having a value −XL with a noise component N2.

The signal values XL that propagates from the output of the amplifier 38 to the input of the RF front end amplifier 60 and −XL which is the signal component at the amplifier 60 which has originated from the second amplifier 138 and propagated through the coupler 150 mutually cancel at the input of the amplifier 60, leaving the wanted signal Xw, plus NL and N2. Any non-cancellation between the signals from the amplifiers 38 and 138 may result in a small residual signal XR.

A scaled version of X1 and N1 is coupled off of the first amplifier 38 and provided to the input of the amplifier 360. The cancellation signal of −XL +N2 is also provided to the input of the amplifier 360. The signal components cancel (or substantially cancel) at the input to the amplifier 360, leaving a noise residue N1 +N2. This noise at the second receiver is correlated with the noise at the first receiver and is used as a reference which can be shaped by a noise canceller 400 to form a noise cancellation signal which can be subtracted from the digital signal output by the analog to digital converter 70.

Transmit noise cancellers are known and can be implemented by the skilled person, as will be described later.

Figure 12:
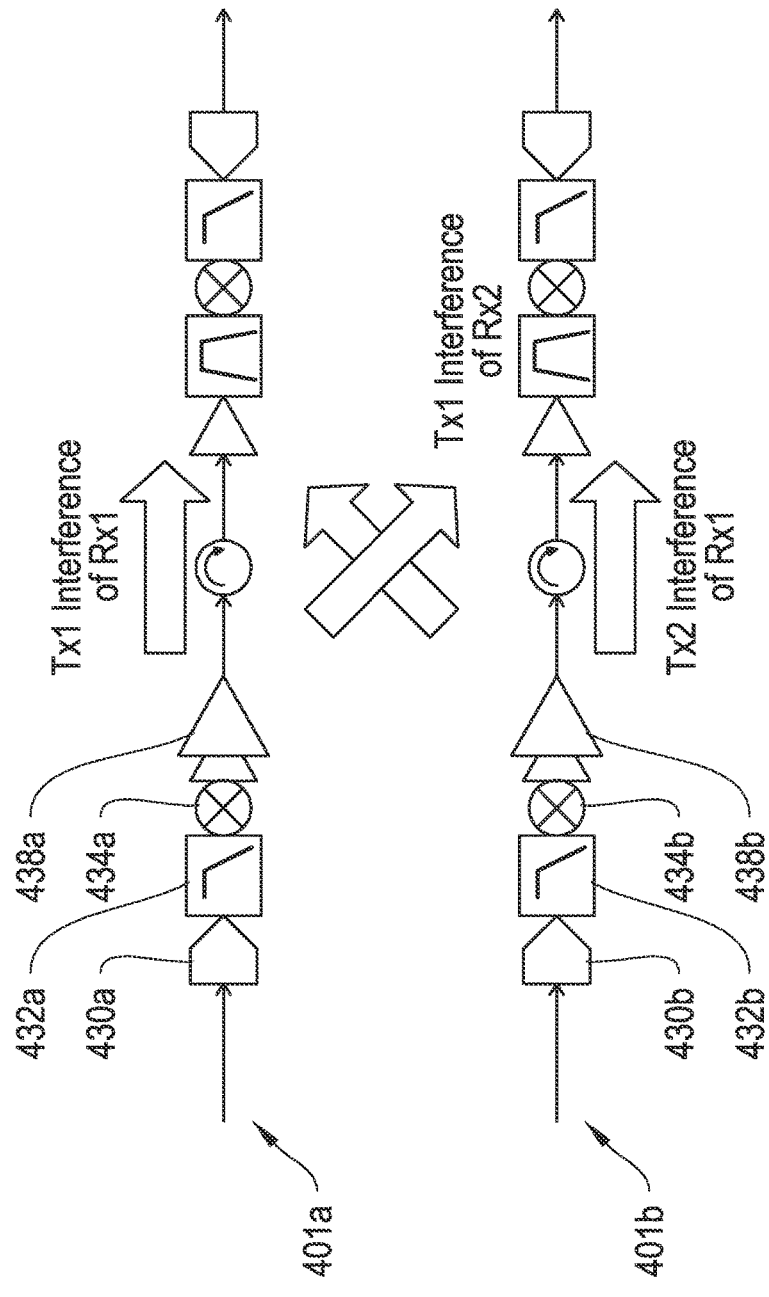
FIG. 12 schematically illustrates first and second channels within a MIMO radio, and showing the potential leakage paths from the first transmitter to the first receiver, the first transmitter to the second receiver, the second transmitter to the second receiver, and the second transmitter to the first receiver.

Teachings of this disclosure can be extended to multiple input multiple output radios. FIG. 12 schematically illustrates a MIMO receiver including a first transceiver 401 and a second transceiver 402. The transmitter portion of each transceiver includes digital to analog converter 430, a filter 432, a mixer 434 and an amplifier 438, designated A and B for the first and second channels 401A and 401B, respectively. Each channel 401A and 401B is associated with a respective receiver and has the potential to cause interference at the respective receiver by virtue of transmitting the same frequency that the receiver is receiving at. The channels 401A and 401B may operate at the same frequency, and distinguish themselves from one another by the use of different channel or spreading codes, or they may operate on similar frequencies. Thus, not only is the potential for the transmitter of the first channel 401A to act as an interferer or blocker with respect to the wanted signal received at the receiver of the first channel 401A but it can also act as an interferer with the signals received at the receiver of the second channel 401B.

The interference from one channel to the next channel will be by way of coupling between the respective channel antennas where multiple antennas are provided, although it would be possible for multiple channels to share an antenna. Other cross coupling mechanisms may also exist, for example via a shared circuit board, coupling via a power supply and so on.

Figure 13:
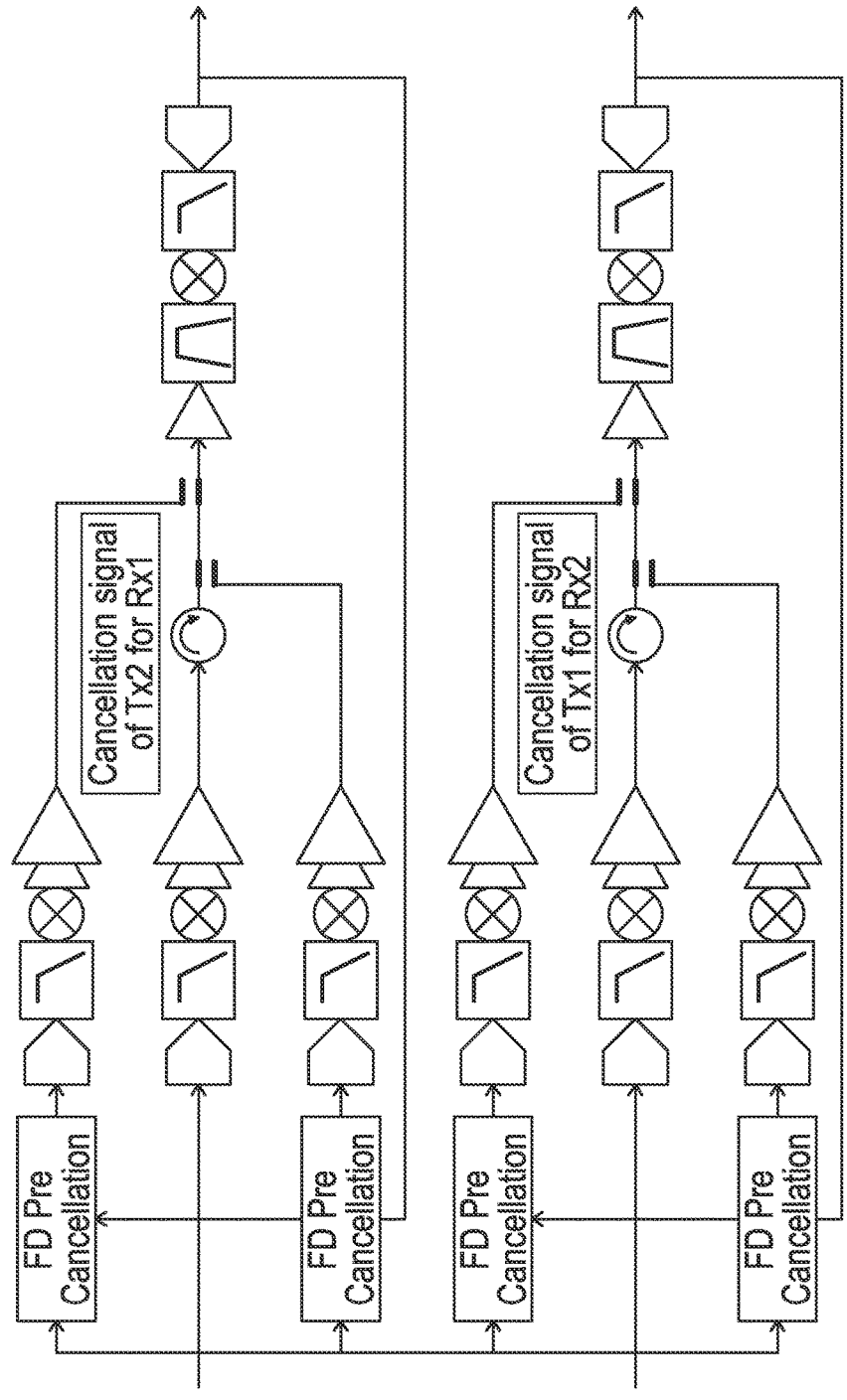
FIG. 13 shows an embodiment of a MIMO receiver including transmitter leakage compensation of the type described earlier, but now applied to within channel and cross channel compensation.
Figure 14:
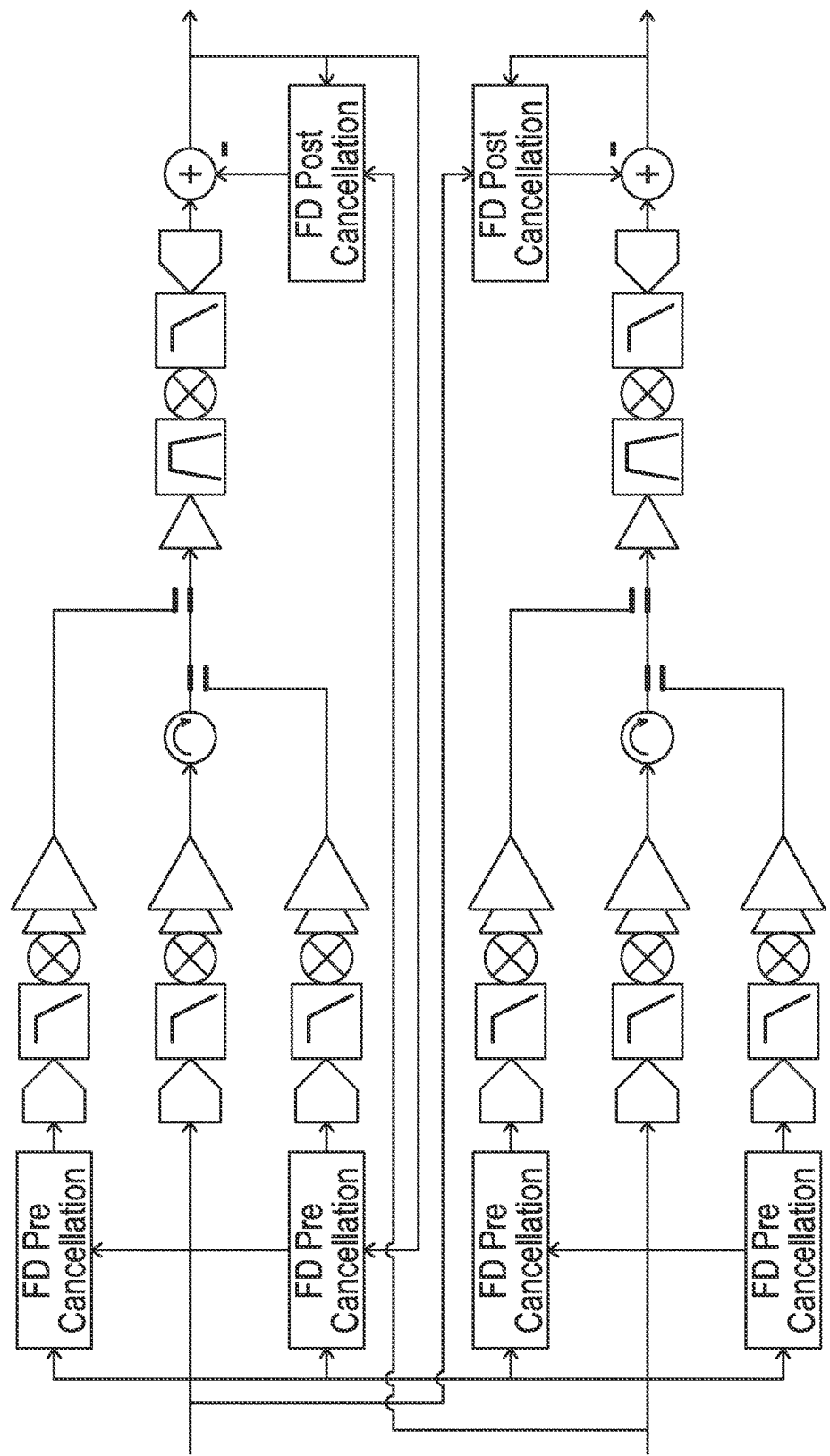
FIG. 14 schematically illustrates a MIMO radio including both RF and baseband compensation.

The RF signal cancellation techniques as described hereinbefore can be used within a channel and between channels of a MIMO receiver, as schematically illustrated in FIG. 13. Furthermore, the post reception (baseband) cancellation techniques as described hereinbefore can also be used in a MIMO receiver as schematically illustrated by FIG. 14.

The estimation of transmitter noise and its reduction is the subject of a co-pending patent applications such as U.S. patent application Ser. No. 13/801,130 filed 13 March 2013, and EP 2779473A, which are incorporated by reference. However for the convenience of the reader, a brief description of the transmit noise cancellation will now be described.

Figure 15:
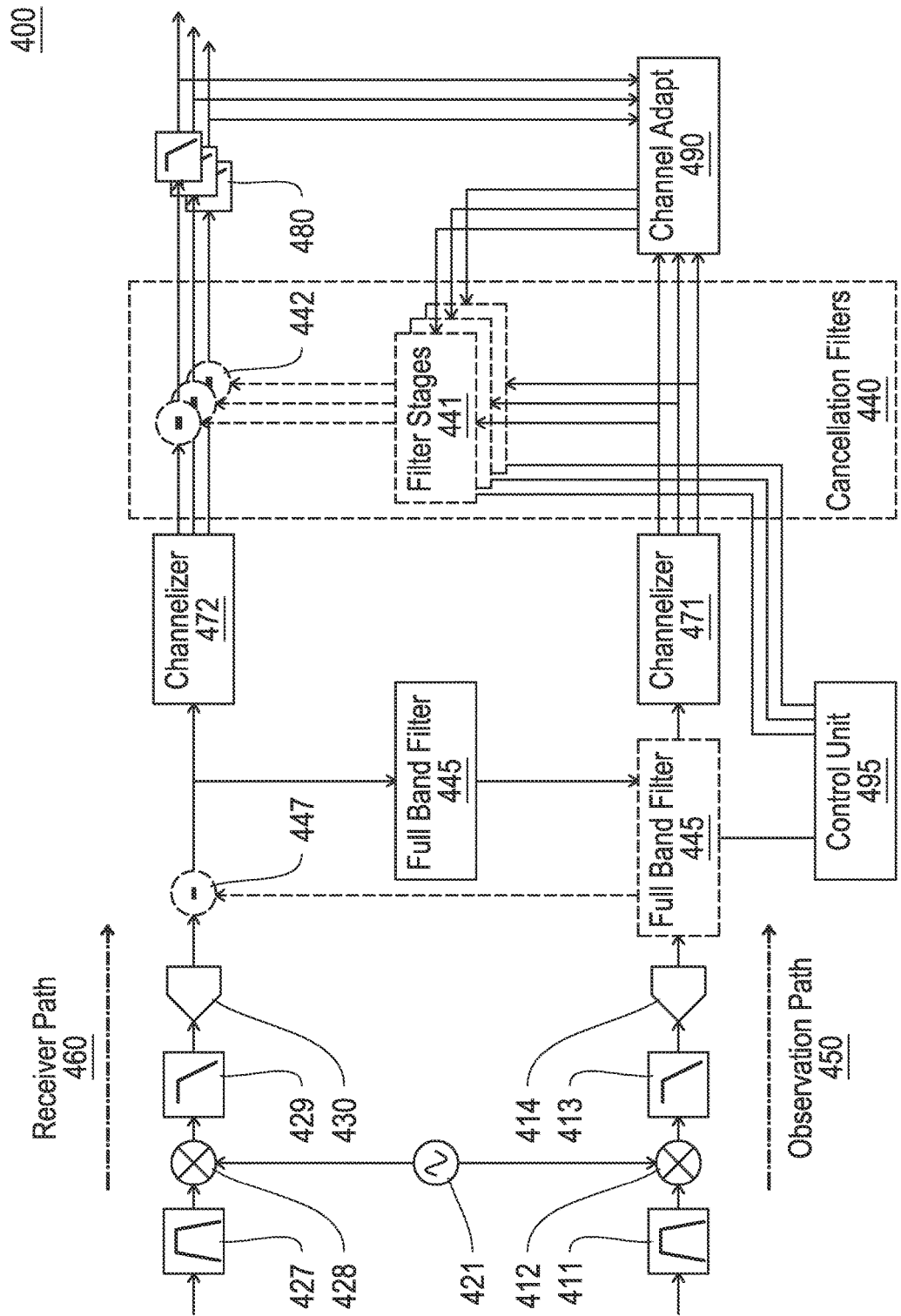
FIG. 15 shows a first transmit noise cancellation circuit.

FIG. 15 shows an exemplary hybrid circuit 400 in an embodiment. A first ADC 430 may be coupled to a receiver (not shown) as in the other figures and optionally a first channelizer 472. An incoming RF signal received at the receiver may propagate along a receiver signal path 460. A second ADC 414 may be coupled to a transmitter (not shown) as in the other figures and optionally a second channelizer 471. An outgoing signal to be transmitted may be propagated along observation path 450 in addition to being transmitted.

Each channelizer 471 and 472 may down convert and/or channelize the signals outputted by the respective ADC 414 and 430. During the channelizing, the channelizers 471 and 472 may split the respective signals into separate channels on a channel by channel basis. Thus, in some instances, the channelizers 471 and 472 may include a separate output for each channel with an incoming RF signal band. In some instances, the channelizers may only output signals on a channel by channel basis for those channels that are active. The channelizers 471 and 472 need not generate output signals for inactive channels. In some instances, the channelizers 471 and 472 may include a DDC, a polyphase, a fast Fourier transform, and/or other type of transmultiplexer.

Two types of cancellation filters 445 and 440 may be provided. A full band cancellation filter 445 may be coupled to the second ADC 414, the second channelizer 471, and a subtractor 447. The subtractor 447 may also be coupled to the first ADC 430 and the first channelizer 471. A full band filter adaptation unit 446, which may include an estimator such as estimator 391, may be used to calculate updated filter coefficients for the full band cancellation filter 445. The full band filter adaptation unit 446 may also be coupled to the receiver signal path 460, in some instances between the subtractor 447 and first channelizer 472.

Channel specific cancellation filters 440 may be provided for each of the channels within the incoming RF signal band. In other instances, channel specific cancellation filters 440 may only be provided for only those active channel(s) within the signal band. Each cancellation filter 440 may be coupled to an output of the first and second channelizers 472 and 471 for the respective channel. Each cancellation filter 440 may be configured to estimate and cancel transmitter noise in each respective active incoming channel.

Each cancellation filter 440 may include a filter stage 441 coupled to a subtractor 442. The subtractor 442 for the cancellation filter 440 in each active channel may be coupled to a respective channel output of the first channelizer 472. The filter stage 441 for the cancellation filter 440 in each active channel may be coupled to a respective channel output of the second channelizer 471. A common filter 480 may be provided for each active channel and coupled to an output of the subtractor 442 for the respective active channel.

A channel filter adaptation unit 490 may be coupled to each channel output of the second channelizer 471, each filter stage 441, and the subtractor 442 and/or common filter 480 for each channel. The channel filter adaptation unit 490 may include an estimator 391 and/or comparator 392 providing the same functionality discussed previously. The full band and channel cancellation filters 445 and 440 may include a memory storing filter coefficients and the updated filter coefficients for the filters 445 and 440.

The full band and channel cancellation filters 445 and 440 may be coupled to a control unit 495 configured to selectively enable and disable each of the filters 445 and 440 to provide the option of using only the full band filter 445, only the channel filter 440, or both filters 445 and 440. The control unit 495 may be configured to select the full band filter 445 in situations where active channels may be concentrated over one contiguous region of the signal band or where signal isolation characteristics do not require complex filtering requiring a large number of filter coefficients to isolate transmitter noise.

The control unit 495 may be configured to select channel filters 440 in situations where the active channels are discontiguously spread across the signal band and located in regions requiring a large number of filter coefficients to isolate transmitter noise. Configuring the control unit 495 to toggle between the channel filters 440 and full band filter 445 may result in improved performance in situations where the low order full band filter 445 is used in low complexity regions discussed above and the channelized filters 440 are only applied to active channels of high complexity.

The filter coefficients of the full band filter 445 and the channel filters 440 may be updated by their respective adaptation units 446 and 490. The coefficient updating processes in these adaptation units 446 and 490 may be performed at different intervals. For example, the filter coefficients of the full band filter 445 may only be configured once in some instances, but the filter coefficients of the channel filters 440 may be configured each time the circuit 400 is powered up or on another periodic basis, such as in one non-limiting example, when the main power level of the received incoming signal is low enough or satisfies some other criteria.

FIG. 16 shows a multi transmitter-receiver cross coupled noise cancellation circuit in an embodiment. In this example, only two transmitter-receiver pairs are shown in respective cross coupled circuits 501 and 502, but other embodiments may include additional transmitters and/or receivers. Circuits 501 and 502 may each include similar components.

For example, each circuit 501 and 502 may include a transmitter 515 transmitting outgoing RF signals, and a receiver 525 receiving incoming RF signals. Each transmitter 515 may be coupled to a RF power amplifier 505 that may amplify outgoing signals to drive an antenna of the transmitter 515. Each circuit 501 and 502 may include a first ADC 530 coupled to its receiver 525. An incoming RF signal received at each receiver 525 may propagate along each respective receiver signal path 560. Each circuit 501 and 502 may include a second ADC 514 coupled to its respective transmitter 515. An outgoing signal to be transmitted at each transmitter 515 may be propagated along a respective observation path 550 from the output of the power amplifier 505 in addition to being transmitted at its respective transmitter 515.

In some instances, each circuit 501 and 502 may include a cancellation filter stage 541 to 544 for each of the receivers included in the embodiment. For example, since FIG. 4 includes two receivers, each of the transmitters 515 may have two cancellation filter stages 541-542 and 543-544. In other instances with different numbers of receivers, the number of filter stages would be adjusted accordingly. Each of the filter stages 541 to 544 may also be coupled to a respective subtractor 551 to 554 and its corresponding second ADC 514.

Each of the filter stages 541 to 544 may be configured to estimate and cancel transmitter noise between the transmitter 515 that the filter stage 541 to 544 is coupled to and a respective one of the incoming signals received at each receiver 525. Thus, filter stage 541 and its subtractor 551 may be configured to reduce transmitter noise from transmitter 515 in circuit 501 from the incoming signal received at receiver 525 of circuit 501. Filter stage 542 and its subtractor 552 may be configured to reduce transmitter noise from transmitter 515 in circuit 501 from the incoming signal received at receiver 525 of circuit 502. Filter stage 543 and its subtractor 553 may be configured to reduce transmitter noise from transmitter 515 in circuit 502 from the incoming signal received at receiver 525 of circuit 501. Filter stage 544 and its subtractor 554 may be configured to reduce transmitter noise from transmitter 515 in circuit 502 from the incoming signal received at receiver 525 of circuit 502.

A low pass filter 531 in circuit 501 may be coupled to the ADC 530 of circuit 501 and subtractors 551 and 553 of filter stages 541 and 543. A low pass filter 531 in circuit 502 may be coupled to the ADC 530 of circuit 502 and subtractors 552 and 554 of filter stages 542 and 544.

In some instances, circuits 501 and 502 may include a first mixer 528 coupled to its receiver 525 and its first ADC 530. The first mixer may mix the incoming radio frequency signal with an oscillating signal from an oscillating source 521. Circuits 501 and 502 may include a second mixer 512 coupled to its respective transmitter 515 and second ADC 514. The second mixer 512 may mix the outgoing signal with the oscillating signal from the oscillating source 521. Circuits 501 and 502 may include a radio frequency amplifier 526 and a first band pass filter 527 coupled between its respective receiver 525 and first mixer 528. Circuits 501 and 502 may include a second band pass filter 511 coupled to its respective transmitter 515 and second mixer 512. Circuits 501 and 502 may include a first low pass filter 529 coupled to its respective first mixer 528 and first ADC 530. Circuits 501 and 502 may include a second low pass filter 513 coupled to the second mixer 512 and the second ADC 514.

An alignment module 565 may be coupled between one or more filter stages 541 and the second ADC 514 in each circuit 501 and 502. The alignment module 565 may be configured to add a delay or otherwise time align the outgoing signal with the received incoming signal to cancel the transmitter noise from the corresponding received incoming signal.

In instances where the outgoing and incoming signals are channelized through respective channelizers or other circuits configured to split the signals on a channel by channel basis, each of the filter stages 541 to 544 and subtractors 551 to 554 may be provided for each of the channels. In some instances, the channelizers may include a DDC, a polyphase, a fast Fourier transform, and/or other type of transmultiplexer. Thus, if the signal band of the incoming signal contains n channels, there may be n copies of filter stage 541 and subtractor 551 for each of then channels, n copies of filter stage 542 and subtractor 552 for each of the n channels, n copies of filter stage 543 and subtractor 553 for each of the n channels, and n copies of filter stage 544 and subtractor 554 for each of the n channels. Thus, variations of the cross coupled noise cancellation circuit may include the noise filter channelization arrangements shown in the other figures and discussed herein.

A multi transmitter-receiver noise cancellation circuit, such as that shown in FIG. 16, may in some instances include a number n of circuits similar to circuits 501 and/or 502, where n is two or more. Each of these circuits may include the same number n of cancellation filters for each active channel. Each of the filter stages of the n cancellation filters for each active channel may be coupled to a respective channel output of the second channelizer for the respective circuit. The subtractor of each cancellation filter for each active channel may be coupled to a respective channel output of the first channelizer for a respective circuit for each of the circuits from 1 to n.

A noise cancellation circuit in an embodiment may also include two or more receivers, each coupled to a respective analog to digital converter (ADC) and a respective channelizer. The noise cancellation circuit may also include two or more transmitters, each also coupled to a respective analog to digital converter (ADC) and a respective channelizer. The noise cancellation circuit may also include a plurality of cancellation filters with at least one cancellation filter coupled between each of the transmitter channelizers and the receiver channelizers.

Figure 17:
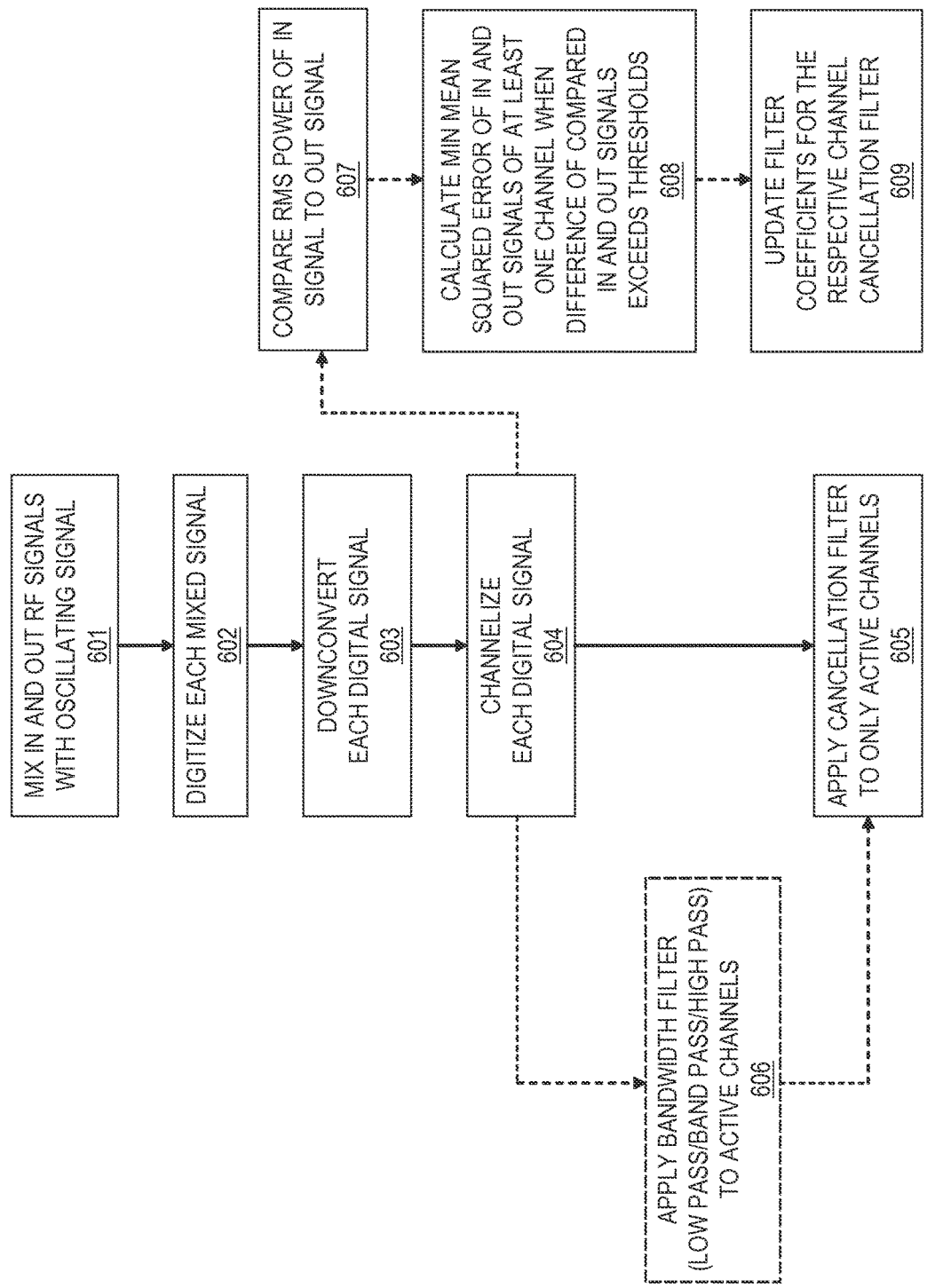
FIG. 17 is a flow diagram for a transmit noise cancellation method.

FIG. 17 shows an exemplary process in an embodiment. In box 601, incoming received RF signals and outgoing RF transmission signals may be mixed with an oscillating signal.

In box 602, each of the mixed signals may be digitized.

In box 603, each of the digitized signals may be digitally down converted.

In box 604, each of the digitized signals may be channelized or split on a channel by channel basis into respective channel components. The digitized signals may in some instances be channelized as part of a digital down conversion process.

In box 605, a noise cancellation filter may be applied to only the identified active channels of the channelized down converted signals. A separate noise cancellation filter may be provided for each channel.

In box 606, a channel filter may be applied to each of the channelized down converted signals before applying the noise cancellation filter. The channel filter may be a low pass filter, a band pass filter, or other filter.

In box 607, a root mean square (RMS) power of the incoming signal may be compared to that of the outgoing signal.

In box 608, a minimum mean square error of the channel filtered incoming and outgoing down converted signals may be calculated for each channel when a difference of the compared RMS power exceeds a threshold.

In box 609, filter coefficients for the noise cancellation filter provided for at least one channel may be updated based on the calculated minimum mean square error.

It is thus possible to provide an improved radio system. The techniques described here can be used with many transceiver architectures such as, for example, direct conversion receivers, low intermediate frequency receivers and super heterodyne receivers.

Full duplex receivers may be used in machine to machine communication as part of the "internet of things". In such an arrangement, each receiver may further include a white space detector to examine the spectrum to identify so called "white spaces" where a portion of the spectrum is currently not in use. A machine wishing to transmit data may then instruct its transceiver to briefly occupy the white space, to establish communication with other machines with which it wishes to communicate data, to communicate that data and then to return that frequency to be used by other transceivers. Thus communication between two such transceivers may involve frequency hopping as each one identifies a new white space as time evolves. Techniques for frequency hopping are known to the person skilled in the art.

The following paragraphs describe examples of various ones of the embodiments disclosed herein.

Example 1 is a radio, including: a first transmitter; a second transmitter; and a receiver; wherein: a) the first transmitter is arranged to receive an input signal, to process the input signal to generate a first transmit signal, and to transmit the first transmit signal; b) the second transmitter is arranged to receive the input signal, to process the input signal to generate a second transmit signal, and to couple the second transmit signal into an input path of the receiver.

Example 2 may include the subject matter of Example 1, and may further specify that the second transmitter further comprises a filter arranged to receive the input signal and to filter the input signal, and an adaptation engine arranged to receive an output from the receiver, and to examine the output from the receiver so as to identify components of the first transmit signal, and to modify filter coefficients of the filter so as to reduce the power of the first transmit signal within the receiver.

Example 3 may include the subject matter of any of Examples 1 or 2, and may further include a baseband cancellation engine arranged to receive the input signal and to generate a correction to be introduced into the baseband processing components of the receiver.

Example 4 may include the subject matter of Example 3, and may further specify that an analog correction signal is formed by the cancellation engine and introduced into a receiver signal path upstream of an analog to digital converter of the receiver.

Example 5 may include the subject matter of any of Examples 3 or 4, and may further specify that a digital correction signal is formed by the cancellation engine and combined with a data stream output from an analog to digital converter of the receiver.

Example 6 may include the subject matter of any of Examples 3, 4 or 5, and may further specify that the cancellation engine is arranged to monitor one or more signals within the receiver, and to adapt the or each correction signal it generates to reduce the power of the first transmit signal at the output of the receiver.

Example 7 may include the subject matter of any of Examples 1-6, and may further include a second receiver and a transmit noise canceller, and wherein signal combiners are provided to couple a scaled combination of the first and second transmit signals to an input of the second receiver, and the transmit noise canceller receives an output from the second receiver, and is arranged to calculate a noise reduction signal that is combined with the output of the first receiver.

Example 8 may include the subject matter of any of Examples 1-7, and may further specify that the radio is a full duplex radio where the transmitter transmits at a first frequency, the receiver receives at the first frequency, and the transmitter and receiver can operate concurrently.

Example 9 may include the subject matter of any of Examples 1-8, and may further include a "white space" detector for detecting an unused frequency baseband within a predetermined part of a frequency spectrum, and adapting the transmitter and receiver to operate at that frequency band.

Example 10 may include the subject matter of any of Examples 1-9, and may further specify that the radio is a MIMO radio having a plurality of transmitters and a plurality of receivers, wherein additional transmitters are provided to generate further transmit signals to be coupled into receive paths of the receivers to reduce interference from one MIMO transmit receive pairing of a transmitter and receiver to another transmit receive pairing of a transmitter and receiver.

Example 11 may include the subject matter of any of Examples 1-10, and may further specify that the radio is part of a mobile telephony unit.

Example 12 may include the subject matter of any of Examples 1 to 10, and may further specify that the radio is a data transmission terminal.

Example 13 may include the subject matter of any of Examples 1 to 10 and may further specify that the radio is part of a machine to machine communication system.

Example 14 is a radio including: a first transmit unit and a first receive unit, where the first transmit unit comprises: a) a first transmitter arranged to receive an input signal, and to up convert it for supply to an antenna. b) a second transmitter arranged to receive the input signal, to adapt it and to up convert it to generate a RF correction signal to be introduced into a RF receive path of the first receive unit so as to reduce a power level of the signal of the first transmitter at a RF amplifier of the first receive unit; and wherein the radio further comprises means for estimating a noise contribution from the first and second transmitters and for subtracting the noise contribution from an output of the receiver.

Example 15 may include the subject matter of Example 14, and may further specify that the means for estimating the noise contribution comprises a combining arrangement for taking the output of the first transmitter and the output of the second transmitter and combining them such that information bearing components of the output signals substantially cancel, thereby leaving a combined noise component, and the combined noise component is demodulated by a second receiver.

Example 16 may include the subject matter of any of Examples 14 or 15, and may further include a transmitter noise cancellation engine for estimating the combined noise component from the first and second transmitters, and generating a correction signal that it combined with the output from the first receive unit.

Example 17 may include the subject matter of any of Examples 14 to 16, and may further specify that the radio comprises a second transmit unit and a second receive unit; and the first transmit unit is arranged to provide a first transmit unit cancellation signal to a RF path of the second receive unit prior to an RF front end amplifier of the second receive unit.

Example 18 may include the subject matter of Example 17, and may further specify that the first transmit unit further comprises a third transmitter arranged to receive the input signal, to adapt it and to generate the first transmit unit correction signal.

Example 19 may include the subject matter of Example 18, and may further specify that the third transmitter includes an adaptation engine that, in use, receives an output of the second receive unit, analyses the output originating from the first transmitter and modifies a signal processing function applied to the input signal so as to reduce the influence of the first transmitter on the second receiver.

Example 20 may include the subject matter of any of Examples 17 to 19, and may further include a third transmit unit and a third receive unit, and further circuits for reducing the influence of each transmitter unit at a RF front-end amplifier of each receive unit.

Example 21 may include the subject matter of any of Examples 14 to 20, and may further include baseband compensation circuits for reducing the influence of each transmitter unit in the demodulated signal path of each receiver unit.

Example 22 may include the subject matter of any of Examples 14 to 21, and may further specify that the radio is a data transmit receive unit.

Example 23 may include the subject matter of any of Examples 11 to 22, and may further specify that the radio is a mobile telephone or a mobile telephone base station.

Example 24 is a duplex radio comprising a transmitter and a receiver, and a RF correction circuit for reducing a received signal from the transmitter at an RF front end of the receiver, and a baseband correction circuit for reducing a received signal from the transmitter in a baseband portion of the receiver.

Example 25 may include the subject matter of Example 24, and may further specify that the baseband correction circuit comprises a correction engine that receives a signal input stream that was provided to the transmitter, receivers an output stream from the receiver, compares the output stream with the signal input stream to identify signal components of the signal input stream, and estimates parameters of a signal processing operation to be applied to the input stream to generate a correction signal to be combined with the output stream or injected into the baseband path of the receiver.

Example 26 may include the subject matter of any of Examples 24 or 25, and may further specify that the RF correction circuit comprises a circuit for forming an RF signals that is scaled and phase shifted with respect to the transmitted RF signal, to substantially cancel the RF signal at a RF front end amplifier of the receiver.

Example 27 may include the subject matter of Example 26, and may further specify that the RF correction circuit comprise a signal processor and a second transmitter, where the signal processor receives an input for the first transmitter and applies a processing operation to produce an intermediate signal that is supplied to the second transmitter.

Example 28 may include the subject matter of Example 27, and may further specify that the signal processor comprises a digital filter.

Example 29 may include the subject matter of Example 28 and may further specify that the filter is a finite impulse response filter.

Example 30 may include the subject matter of any of Examples 1 to 8 or 14 to 24, and may further specify that the radio is used to provide back haul from a mobile telephony base station.

Example 31 is a method of compensating for leakage from a transmitter to a receiver, the method comprising filtering a data stream to the transmitter to provide an input to the second transmitter and providing an output of the second transmitter to an RF signal path of the receiver to substantially cancel leakage from the first transmitter, the method further comprising at least one of a) providing baseband correction by forming a correction signal to be applied to the baseband processing parts of the receiver, the baseband correction signal being formed by comparing the output of the receiver with the data stream; b) noise reduction to attenuate noise components from the first and second transmitters; c) correction for adjustment channels in MIMO system.

Example 32 is an apparatus including means for performing the method of Example 31 or any of the methods (or portions of the methods) disclosed herein.

Example 33 is one or more computer readable media (e.g., non-transitory computer readable media) having instructions thereon that, in response to execution by one or more processing devices of an apparatus, cause the apparatus to perform the method of Example 31 or any of the methods (or portions of the methods) disclosed herein.

What is claimed is:

1. A full duplex radio with reduced noise, comprising:
   a first transmitter;
   a second transmitter, different from the first transmitter;
   a receiver; and
   a noise correction circuit;
   wherein:
   the first transmitter is to receive an input signal, process the input signal to generate a first transmit signal, and transmit the first transmit signal,
   the second transmitter is to receive the input signal, process the input signal to generate a second transmit signal, and couple the second transmit signal into an input path of the receiver,
   the noise correction circuit is to generate a correction signal and to couple the correction signal into an output path of the receiver, and
   the input path of the receiver is between a baseband source and the receiver, and the output path of the receiver is different from the input path of the receiver.

2. The full duplex radio of claim 1, wherein the second transmitter comprises:
   a filter to receive the input signal and to filter the input signal; and
   an adaptation engine to receive an output from the receiver, identify components of the first transmit signal in the output from the receiver, and modify filter coefficients of the filter based on the identified components of the first transmit signal.

3. The full duplex radio of claim 1, wherein the noise correction circuit is to receive the input signal, and the correction signal is based on the input signal.

4. The full duplex radio of claim 3, wherein the correction signal is an analog signal, and the noise correction circuit is to, as part of coupling the correction signal into the output path of the receiver, couple the correction signal into a receiver signal path upstream of an analog to digital converter of the receiver.

5. The full duplex radio of claim 3, wherein the correction signal is a digital signal, and the noise correction circuit is to, as part of coupling the correction signal into the output path of the receiver, couple the correction signal into a receiver signal path downstream of an analog to digital converter of the receiver.

6. The full duplex radio of claim 3, where the noise correction circuit is to, as part of generation of a correction signal, monitor one or more signals within the receiver and adapt the correction signal based on the one or more signals.

7. The full duplex radio of claim 1, wherein:

the receiver is a first receiver;

the full duplex radio further includes a second receiver; and the noise correction circuit is to receive an output from the second receiver, process the output of the second receiver to generate the correction signal, and couple the correction signal into the output path of the first receiver.

8. The full duplex radio of claim 1, wherein the first transmitter transmits at a first frequency, the receiver receives at the first frequency, and the first transmitter and the receiver can operate concurrently.

9. The full duplex radio of claim 1, further comprising:

a white space detector to detect an unused frequency band within a predetermined part of a frequency spectrum, and to adapt the first transmitter and the receiver to operate at the unused frequency band.

10. The full duplex radio of claim 1, wherein the full duplex radio is a multiple input multiple output (MIMO) radio.

11. The full duplex radio of claim 1, wherein the full duplex radio is part of a mobile telephony unit.

12. The full duplex radio of claim 1, wherein the full duplex radio is part of a machine-to-machine communication system.

* * * * *